(12) United States Patent
Imai

(10) Patent No.: US 9,543,672 B2
(45) Date of Patent: Jan. 10, 2017

(54) TERMINAL BLOCK DEVICE

(71) Applicant: KABUSHIKI KAISHA TOYOTA JIDOSHOKKI, Kariya-shi, Aichi-ken (JP)

(72) Inventor: Tsutomu Imai, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/991,447

(22) Filed: Jan. 8, 2016

(65) Prior Publication Data
US 2016/0204529 A1    Jul. 14, 2016

(30) Foreign Application Priority Data

Jan. 13, 2015   (JP) ................................ 2015-004007
Sep. 14, 2015   (JP) ................................ 2015-180366

(51) Int. Cl.
H01R 12/00    (2006.01)
H01R 9/24     (2006.01)
H01R 4/30     (2006.01)
H01R 11/12    (2006.01)
H01R 13/447   (2006.01)

(52) U.S. Cl.
CPC ........ H01R 9/24 (2013.01); H01R 4/30 (2013.01); H01R 9/2425 (2013.01); H01R 11/12 (2013.01); H01R 13/447 (2013.01)

(58) Field of Classification Search
CPC ................. H01R 713/6658; H01R 2201/26; H01R 85/2035; H01R 31/10; H01R 9/2458

USPC ..... 439/76.1, 76.2, 79, 80, 620.34, 949, 723
See application file for complete search history.

(56) References Cited

U.S. PATENT DOCUMENTS

| | | | | |
|---|---|---|---|---|
| 7,704,077 | B1* | 4/2010 | Morley | H01R 24/50 439/63 |
| 7,713,070 | B2* | 5/2010 | Sasaki | H01R 13/70 361/736 |
| 7,722,372 | B2* | 5/2010 | Matsumoto | H01R 13/42 174/68.2 |
| 7,914,298 | B2* | 3/2011 | Lauermann | H01R 13/5205 439/76.1 |

(Continued)

FOREIGN PATENT DOCUMENTS

| | | |
|---|---|---|
| JP | 2005-318742 A | 11/2005 |
| JP | 2010-074958 A | 4/2010 |
| JP | 2012-199191 A | 10/2012 |

*Primary Examiner* — Phuongchi T Nguyen
(74) *Attorney, Agent, or Firm* — Sughrue Mion, PLLC

(57) ABSTRACT

A terminal block device to which a first wire and a second wire are to be connected includes a terminal block body made of an insulating material, a cover that is made of an insulating material and covers the terminal block body, a shaft member at which a terminal of the first wire and a terminal of the second wire are engaged, a cylindrical relay terminal through which the shaft member is inserted and which is inserted through the cover, a fastening member for fastening the terminal of the first wire and the terminal of the second wire to the relay terminal. The relay terminal includes a first seat surface that is contactable with the terminal of the first wire between the terminal block body and the cover and a second seat surface that is contactable with the terminal of the second wire outside the cover.

8 Claims, 14 Drawing Sheets

(56) References Cited

U.S. PATENT DOCUMENTS

| | | | | |
|---|---|---|---|---|
| 8,338,708 B2 * | 12/2012 | Maebashi | ................ | H01R 4/22 |
| | | | | 174/87 |
| 8,419,443 B2 * | 4/2013 | Kamo | .................. | H01R 13/696 |
| | | | | 439/76.1 |
| 2010/0066185 A1 | 3/2010 | Kosaki | | |

* cited by examiner

TERMINAL BLOCK DEVICE

BACKGROUND OF THE INVENTION

The present invention relates to a terminal block device. More particularly, the invention relates to a terminal block device to which a plurality of first wires and a plurality of second wires electrically are to be connected.

Japanese Unexamined Patent Application Publication No. 2012-199191 discloses a terminal block device that includes a resin support and an insert bolt that is partially embedded in the resin support. The insert bolt includes a bolt, a nut that is screwed onto the bolt. The bolt has a head portion, a threaded portion, and a flange portion that has a shape of a collar formed around an edge of the head portion on the threaded portion side. The nut as screwed onto the threaded portion of the bolt has on the side thereof adjacent to the head portion of the bolt a first end surface that contacts with the head portion of the bolt and on the opposite side thereof a second end surface from which part of the threaded portion of the bolt extends out. With the nut screwed on the bolt, the head portion and the flange portion of the bolt and the nut are embedded in the resin support with the second end surface of the nut exposed above the surface of the support.

According to the terminal block device disclosed in Japanese Unexamined Patent Application Publication No. 2012-199191, mounting a crimp terminal to the terminal block device is performed by firstly placing the crimp terminal onto the second end surface of the nut that is exposed above the surface of the resin support and then fastening tight the crimp terminal by a fixing nut until the crimp terminal firmly contacts with the second end surface of the nut. The fastened crimp terminal is pressed against the second end surface of the nut, so that the second end surface of the nut is subjected to a pressure. Therefore, no pressure is applied from the fixing nut to the support and no creep or cold flow occurs in the resin support, and re-tightening of the fixing nut is unnecessary.

Japanese Unexamined Patent Application Publication No. 2005-318742 discloses an electric motor that includes a motor body. The motor body includes a rotor fixed on a shaft, a cylindrical stator disposed around the rotor, an end bracket that covers one end of the stator, and another end bracket that covers the other end of the stator. The stator has a stator winding and a plurality of external connection terminals each including a lead wire is connected to the stator winding. The electric motor further includes a plurality of terminal blocks to which the respective external connection terminals are connected, a terminal cover that covers the external connection terminals and the terminal blocks, and a mounting bracket for mounting the terminal blocks and the terminal cover to the motor body. The external connection terminals are disposed in an L-shape extending from the stator winding radially outwardly and then along the stator in an axial direction of the electric motor.

Japanese Unexamined Patent Application Publication No. 2010-74958 discloses a method for manufacturing a motor, and the motor. The motor disclosed in the above Publication includes a cylindrical frame and a first end bracket that is connected to the rear end of the cylindrical frame. The first end bracket substantially closes an entire opening of the frame at the rear end thereof. An opening is formed between the frame and a first end bracket in upper part thereof. A terminal block is disposed in the opening and fixed to the upper outer surface of the frame. The terminal block includes a terminal block body that has a cuboid shape and is made of a resin and a plurality of bolts that are inserted through the resin terminal block body. The bolts are inserted such that ends of the bolts extend out from or above the upper surface of the terminal block body. The terminal block body is disposed such that the rear surface of the terminal block body faces toward the first end bracket through the terminal block accommodating opening.

The stator includes an iron core having first and second coil ends and a winding wound around the iron core, and a plurality of lead wires of different phases extends out from the first coil end. A round crimp terminal as a connection terminal is fixed to an end of each lead wire. The lead wires extend radially outwardly from the first coil end and bent in an arc shape so as to be directed to the terminal blocks. The round crimp terminals for the respective lead wires are fixed to the terminal blocks by a bolt. Each lead wire is electrically connected to its corresponding terminal block through the round crimp terminal.

However, the terminal block disclosed in Japanese Unexamined Patent Application Publication No. 2012-1991191 has a plurality of terminals connected thereto and the terminals are isolated from one another by partition members for insulation of the wires. Such configuration of the terminal block allows the wires to be arranged or oriented only in one direction. Furthermore, in the terminal block disclosed in the same Publication, a part of the bolt and the nut that is screwed onto the bolt need to be fixed within the molded resin support. Although some terminal blocks allow selection of the orienting direction of wires out of two directions, there still remain problems associated with the restriction of orienting direction of wires for connection to the terminal block, thus limiting the freedom in the wire connection.

In Japanese Unexamined Patent Application Publications No. 2005-318742 and No. 2010-74958, the lead wires of different phases are extended out from the stator, bent into an L-shape or an arc shape, and connected to the respective terminal blocks. Therefore, depending on the manner of bending, the wires may be bent to such an extent that no sufficient insulation distance is provided between the wires and the end bracket. In order to secure a sufficient insulation distance between the wires and the end bracket, the degree of bending of the wire needs to be determined accurately for connecting the wires to the terminal blocks, which makes the connecting work troublesome and time consuming.

The present invention has been made in view of the above problems and it is a first object of the invention to provide a terminal block device that allows an enhanced freedom in the orienting direction of wires for connection to the terminal block device, requires no resin support that is molded with conductive members embedded therein and therefore is capable of preventing creep in the material of the support.

It is a second object of the present invention to provide a terminal block device that allows connection of wires to a terminal block irrespective of the degree of bending of the wires.

SUMMARY OF THE INVENTION

In accordance with a first aspect of the present invention that has been made to solve the above problem, there is provided a terminal block device that includes a terminal block body made of an insulating material, a cover that is made of an insulating material and covers the terminal block body, a shaft member that is held by the terminal block body to engage a terminal of a first wire and a terminal of a second wire, a cylindrical relay terminal through which the shaft member is inserted and which is inserted through the cover, a fastening member that is mounted on the shaft member to fasten the terminal of the first wire and the terminal of the second wire to the relay terminal. The relay terminal includes a first seat surface that is contactable with the terminal of the first wire between the terminal block body and the cover and a second seat surface that is contactable with the terminal of the second wire outside the cover.

In accordance with a second aspect of the present invention, there is provided a terminal block device to be fixed to a base and electrically connected to one end of a first wire and one end of a second wire. The base houses the other end of the first wire, and the first wire includes a bent portion and a terminal-side portion that extends from the bent portion to the terminal of the first wire. The terminal block device includes a terminal block that is made of an insulating material, a terminal portion that is mounted to the terminal block, and a partition plate that extends from the terminal block perpendicularly to a direction in which the terminal-side portion extends. In the terminal block device, the partition plate is interposed between the other end of the first wire and the base after the terminal block is fixed to the base.

Other aspects and advantages of the invention will become apparent from the following description, taken in conjunction with the accompanying drawings, illustrating by way of example the principles of the invention.

DETAILED DESCRIPTION OF THE EMBODIMENTS

First Embodiment

The following will describe a terminal block device according to a first embodiment of the present invention with reference to FIGS. 1 to 7C. The terminal block device according to the first embodiment is adapted for use in a three-phase induction motor.

Figure 1:
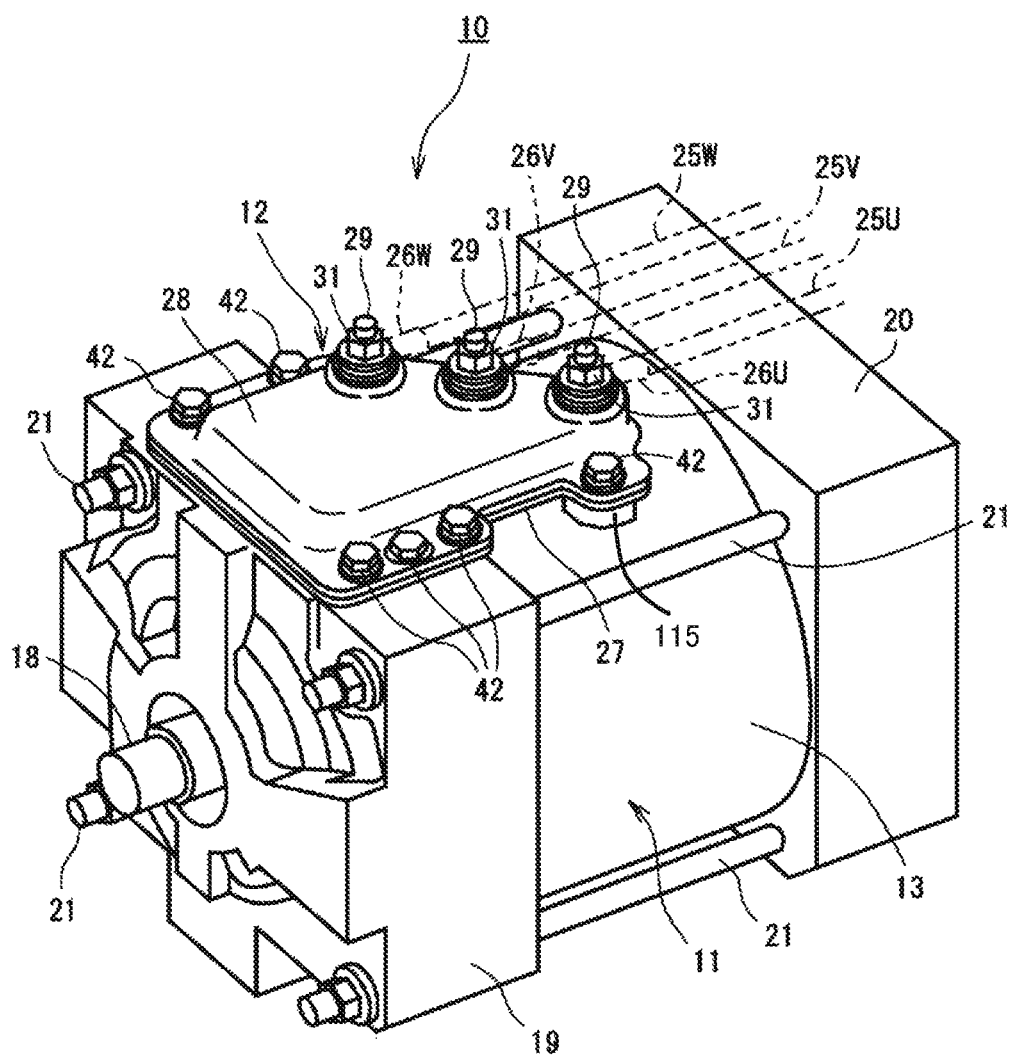
FIG. 1 is a perspective view of an electric motor having a terminal block device according to an embodiment of the present invention.
Figure 2:
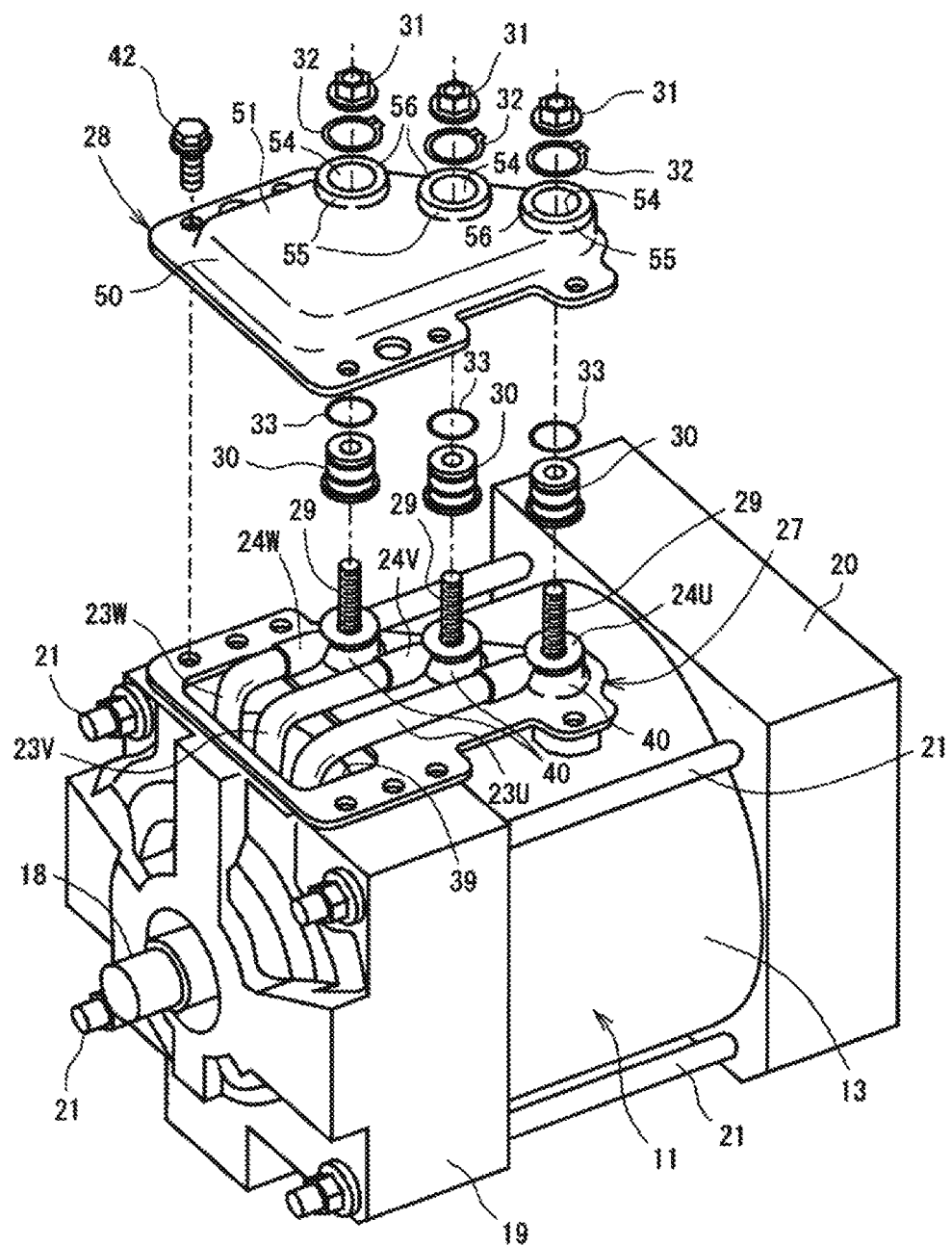
FIG. 2 is a perspective view of the electric motor of FIG. 1, showing the terminal block device in an exploded view.
Figure 3:
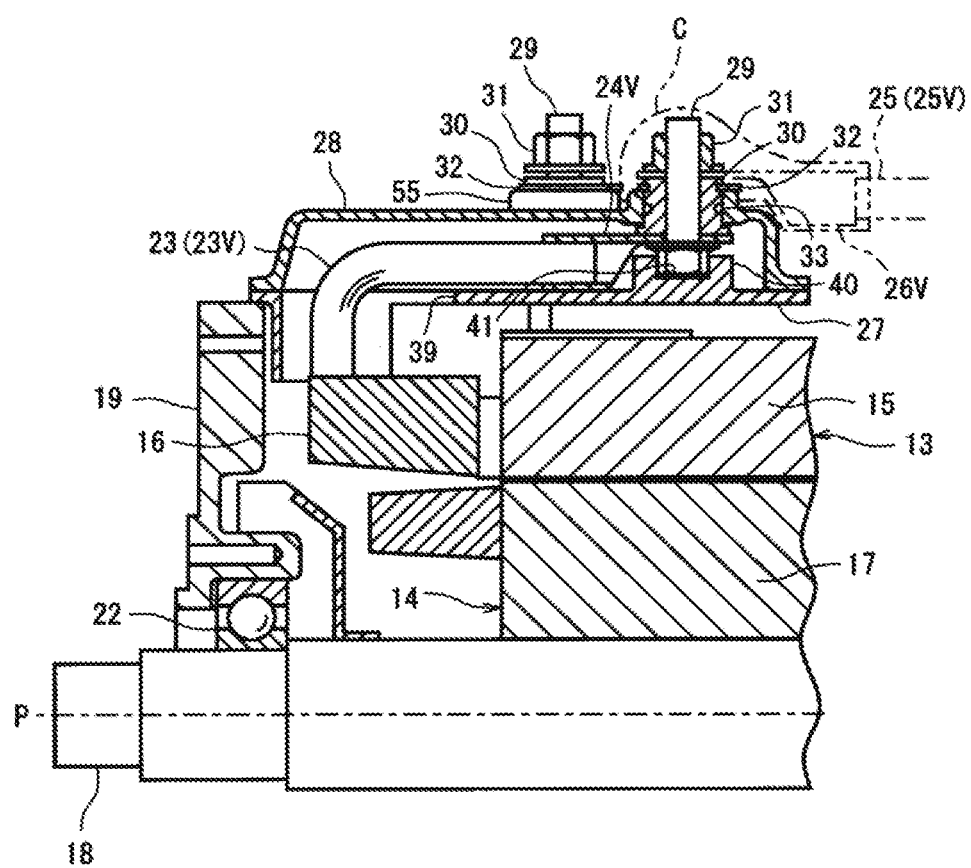
FIG. 3 is a longitudinal fragmentary sectional view of the electric motor of FIG. 1.

Referring to FIGS. 1 and 2, there is shown an electric motor 10 having a terminal block device 12 of the first embodiment. The electric motor 10 includes a motor body 11 and the terminal block device 12 is installed on the motor body 11. A three-phase induction motor is used as the electric motor 10. Referring to FIG. 3, the motor body 11 includes a stator 13 and a rotor 14 that rotates within the stator 13. The stator 13 includes a stator core 15 and a coil 16 having at the opposite ends thereof coil ends. It is to be noted that FIG. 3 shows only one coil end of the coil 16. The electric motor 10 includes a rotary shaft 18 and the rotor 14 includes a rotor core 17 that is fixed on the rotary shaft 18.

As shown in FIGS. 1 and 2, the electric motor 10 further includes a front cover 19 and a rear cover 20 for covering the opposite coil ends of the coil 16 of the stator core 15, respectively. The front cover 19 and the rear cover 20 are fixed to the stator 13 by bolts 21. As shown in FIG. 3, one end of the rotary shaft 18 is supported by the front cover 19 through a bearing 22 and extends out from the front cover 19. The one end of the rotary shaft 18 extending out from the front cover 19 serves as the output shaft end. The other end of the rotary shaft 18 is supported through another bearing (not shown in the drawing).

According to the first embodiment, a plurality of wires 23 extends from the coil end of the coil 16 on the front cover 19 side of the electric motor 10. As shown in FIG. 2, the wires 23 are three-phase wires including a U-phase wire 23U, a V-phase wire 23V, and a W-phase wire 23W and correspond to the first wires of the present invention. The U-phase wire 23U, the V-phase wire 23V, and the W-phase wire 23W are connected to the terminal block device 12. Each wire 23 has at one end thereof a round crimp terminal 24. Specifically, the U-phase wire 23U has a crimp terminal 24U, the V-phase wire 23V has a crimp terminal 24V, and the W-phase wire 23W has a crimp terminal 24W, respectively. A plurality of external wires 25 is at one end thereof connected to the terminal block device 12, as indicated by phantom lines in FIGS. 1 and 3, and at the other end thereof to an external device, such as an inverter. As shown in FIG. 1, the wires 25 are three-phase wires including a U-phase wire 25U, a V-phase wire 25V, and a W-phase wire 25W and correspond to the second wires of the present invention. As many wires 25 as the wires 23 are provided. Each wire 25 has at one end thereof a round crimp terminal 26. Specifically, the U-phase wire 25U has a crimp terminal 26U, the V-phase wire 25V has a round crimp terminal 26V, and the W-phase wire 25W has a round crimp terminal 26W, respectively. As indicated by phantom lines in FIGS. 3, 6 and 7, each of the U-phase wire 25U, the V-phase wire 25V, and the W-phase wire 25W has a protective cap C that covers its corresponding crimp terminals.

The following will describe the terminal block device 12 to which the wires 23 and the wires 25 are electrically connected. As shown in FIG. 1, the terminal block device 12 according to the first embodiment is mounted across the front cover 19 and the stator 13 so that the terminal block device 12 is disposed on top of the electric motor 10. Referring to FIG. 2, the terminal block device 12 includes a terminal block body 27, a cover 28, a plurality of bolts 29 as the shaft member of the present invention, a plurality of cylindrical relay terminals 30, a plurality of nuts 31 as the fastening member of the present invention, a plurality of snap rings 32 as the retainer of the present invention, and a plurality of O-rings 33 as the seal member of the present invention. In the terminal block device 12 of the first embodiment, the numbers of the relay terminals 30, the bolts 29, and the nuts 31 correspond to the numbers of the respective wires 23 and 25.

Figure 4:
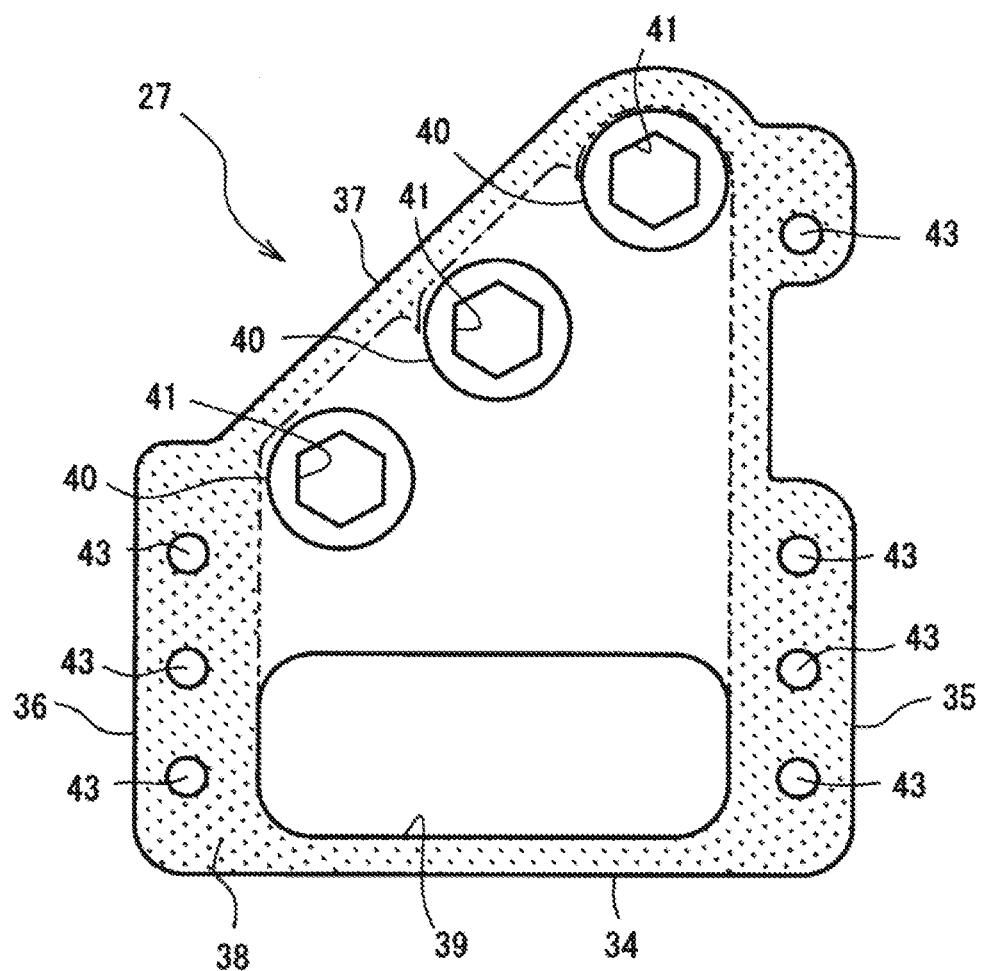
FIG. 4 is a plan view of a terminal block body of the terminal block device.

The terminal block body 27 is made of an insulation material, such as polyamide resin, formed in a flat plate shape. The terminal block body 27 as mounted on the electric motor 10 has a front edge 34 that is located on the front cover 19 side, as shown in FIG. 4. The terminal block body 27 also has a pair of side edges 35 and 36 that extend from the opposite ends of the front edge 34, respectively, substantially at a right angle. The side edge 35 extending from one end of the front edge 34 is longer than the side edge 36 extending from the other end of the front edge 34 as measured in the direction perpendicular to the extending direction of the front edge 34. The terminal block body 27 also has a rear edge 37 that extends between the side edges 35 and 36 on the side of the terminal block body 27 opposite to the front edge 34. As shown in FIG. 4, the rear edge 37 extends at an angle of about 45 degrees with respect to the front edge 34. The front edge 34, the side edge 35, the side edge 36, and the rear edge 37 cooperate to form the outer periphery of the terminal block body 27. As indicated by hatching in FIG. 4, the terminal block body 27 has in the outer peripheral region thereof a joint portion 38 that is joined with the cover 28.

The terminal block body 27 has a rectangular opening 39 at a position closer to the front edge 34 than to the rear edge 37. The opening 39 is formed for allowing the U-phase wire 23U, the V-phase wire 23V, and the W-phase wire 23W are to be passed therethrough. Three raised portions 40 are formed in the surface of the terminal block body 27 at positions closer the rear edge 37 than the front edge 34. The three raised portions 40 are disposed along the rear edge 37. Each raised portion 40 has a hexagonal bottomed hole 41 in which part of a bolt 29 is insertable. The bolt 29 that is partially inserted into the bottomed hole 41 is held by the terminal block body 27. The bottomed holes 41 are disposed along the rear edge 37 that is inclined at an angle of about 45 degrees with respect to the front edge 34 so as to ensure the freedom in the orienting direction of the U-phase wire 25U, the V-phase wire 25V, and the W-phase wire 25W to the terminal block device 12. The terminal block body 27 has a plurality of holes 43 through which bolts 42 for fixing the terminal block body 27 to the electric motor 10 are inserted. The holes 43 are disposed along the opposite side edges 35 and 36.

Figure 5A:
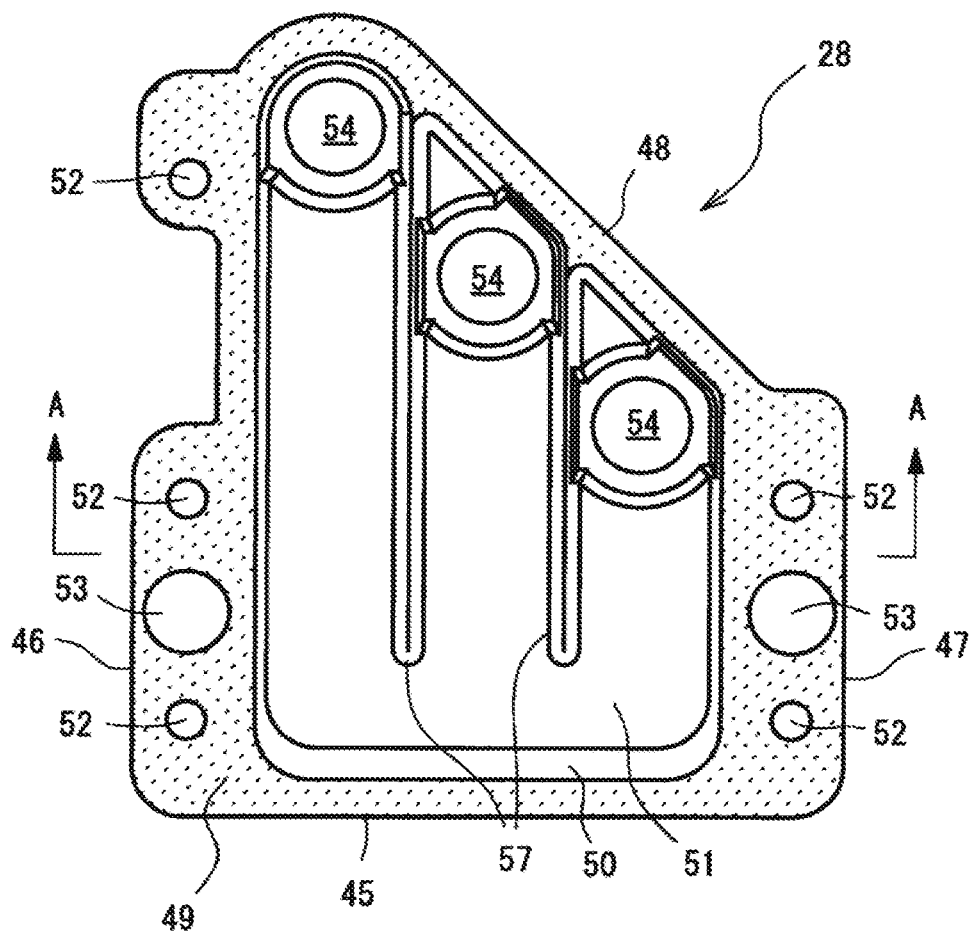
FIG. 5A is a bottom view of a cover of the terminal block device.
Figure 5B:
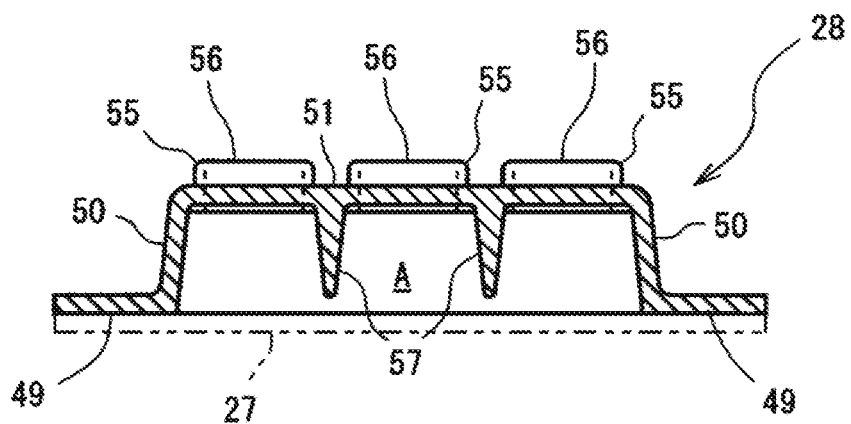
FIG. 5B is a cross-sectional view taken along line A-A of FIG. 5A.

The cover 28 is made of the same insulation material as the terminal block body 27. The outer periphery of the cover 28 conforms to the outer periphery of the terminal block body 27. Specifically, as shown in FIG. 5A, the cover 28 has a front edge 45 that corresponds to the front edge 34 of the terminal block body 27, side edges 46 and 47 that correspond to the side edges 35 and 36, respectively, and a rear edge 48 that corresponds to the rear edge 37. As indicated by hatching in FIG. 5A, the cover 28 has in the outer peripheral region thereof a joint portion 49 that is joined with the joint portion 38 of the terminal block body 27. As shown in FIG. 5B, the cover 28 includes a peripheral wall 50 that rises from the inner edge of the joint portion 49 and a top wall 51 that is formed integrally with the peripheral wall 50 and spaced from the joint portion 49, so that a space is formed between the cover 28 and (the top surface of) the terminal block body 27. The joint portion 49 has a plurality of holes 52 and 53 through which the bolts 42 are inserted.

As shown in FIG. 5B, with the cover 28 placed on the terminal block body 27 and joined together at the joint portions 38, 49 of the cover 28 and the terminal block body 27, a space A is formed between the terminal block body 27 and the cover 28 in which part of the U-phase wire 23U, the V-phase wire 23V, and the W-phase wire 23W are disposed. The inner wall surface of the top wall 51 of the cover 28 faces the terminal block body 27. The terminal block body 27 has a surface facing the cover 28 except the joint portion 38 and the opening 39. Such surface that faces the inner wall surface of the top wall 51 corresponds to the opposing surface of the present invention.

The cover 28 has a plurality of round insertion holes 54 at positions closer to the rear edge 48 than to the front edge 34. Relay terminals 30 are inserted through the insertion holes 54. With the cover disposed on and joined to the terminal block body 27, the centers of the insertion holes 54 coincide with the centers of their corresponding bottomed holes 41. Specifically, the insertion hole 54 and the bottomed hole 41 in pair are disposed concentric to each other in vertical direction. In the first embodiment, three insertion holes 54 are formed corresponding to the bottomed holes 41 of the three raised portions 40. Each insertion hole 54 has a cylindrical wall portion 55 that is formed integrally with and raised from the top wall 51 so as to surround the insertion hole 54. Each cylindrical wall portion 55 has an annular top surface 56 that is parallel to the top wall 51 of the cover 28.

The cover 28 has two insulating partitions 57 extending from the inner wall surface of the top wall 51 so as to divide the space A into three parts. Each insulating partition 57 has a length in the direction perpendicular to the front edge 45. Each insulating partition 57 extends such that one end thereof on the rear edge 48 side is disposed between two adjacent insertion holes 54 and reaches the joint portion 49 while the other end thereof on the front edge 45 side does not reach the joint portion. The insulating partitions 57 provide insulation between any two adjacent wires (i.e. between the U-phase wire 23U and the V-phase wire 23V and between the V-phase wire 23V and the W-phase wire 23W) in the space A.

Figure 6:
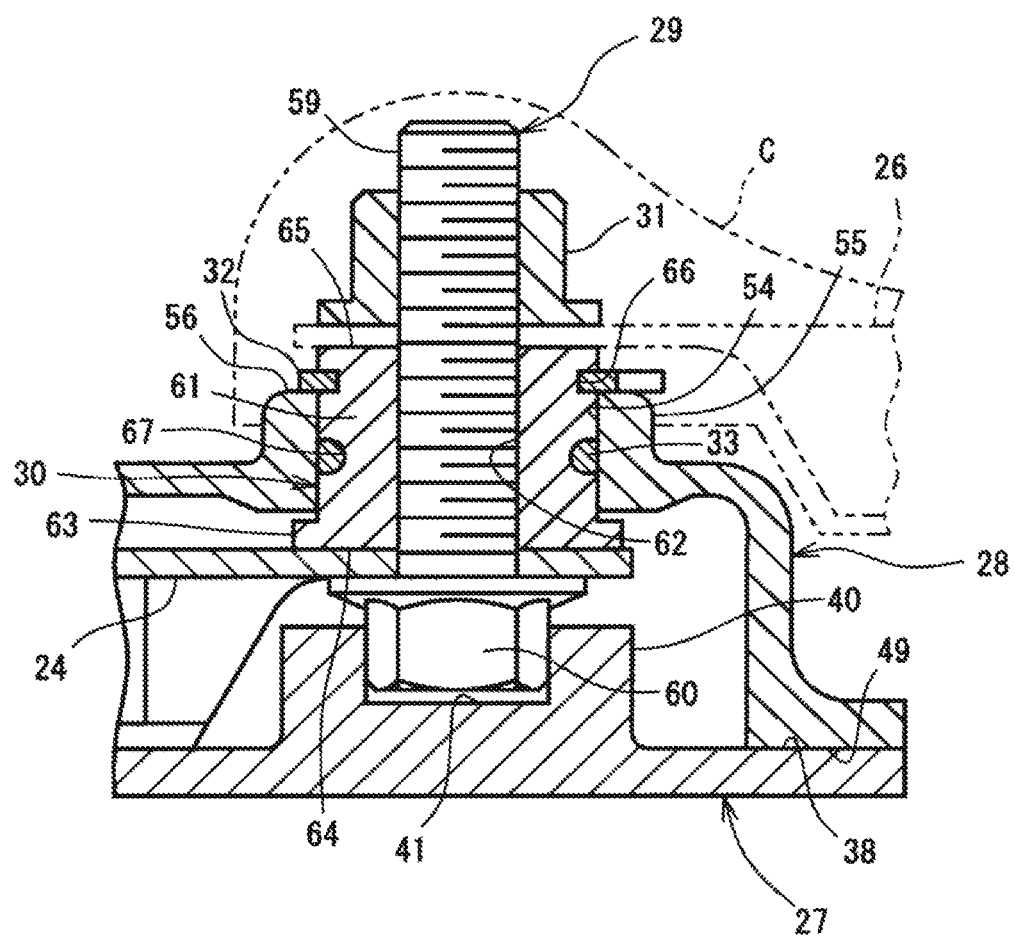
FIG. 6 is a cross-sectional view of major part of the terminal block device.

The bolt 29 as the shaft member of the present invention will now be described with reference to FIG. 6. As shown in the drawing, the bolt 29 is a hexagon head bolt including an externally threaded shaft portion 59 and a head portion 60. Since the head portion 60 of the bolt 29 is formed in a hexagonal prism, when the head portion 60 of the bolt 29 is inserted and engaged with the hexagonal bottomed hole 41 of the terminal block body 27, the bolt 29 is held from turning about the axis of the shaft portion 59. Therefore, the bottomed hole 41 serves as the anti-turn mechanism. The shaft portion 59 of the bolt 29 has such a length that, in the state where the cover 28 and the terminal block body 27 are joined together and the bolt 29 is retained in the terminal block body 27, the end of the shaft portion 59 is protruded out of the insertion hole 54 of the cover 28, as shown in FIG. 6. The nut 31 as the fastening member of the present invention is a known nut which allows the shaft portion 59 of the bolt 29 to be screwed thereinto.

The relay terminals 30 will now be described with reference to FIGS. 3 and 6. The relay terminals 30 are made of highly conductive copper and formed in a cylindrical shape. The relay terminals 30 connect the wires 23 on the electric motor 10 side and the external wires 25 to each other in an indirect manner, as illustrated in FIG. 3. Each relay terminal 30 includes a cylindrical body 61 having in the center thereof an insertion hole 62. The insertion hole 62 is internally threaded to receive therein the shaft portion 59 of the bolt 29. The body 61 of the relay terminal 30 has at one end thereof a flange portion 63 having an outer diameter that is greater than an outer diameter of the body 61. Therefore, the relay terminal 30 inserted through the insertion hole 54 of the cover 28 is prevented by the flange portion 63 from being slipped off from the insertion hole 54.

In the first embodiment, each relay terminal 30 has at the one end thereof on the flange portion 63 side an end surface 64, which corresponds to the first seat surface of the present invention that is contactable with the crimp terminal 24 of its corresponding wire 23 on the electric motor 10 side. The relay terminal 30 has at the other end thereof on the side opposite to the flange portion 63 an end surface 65, which corresponds to the second seat surface of the present invention that is contactable with the crimp terminals 26 of the external wires 25.

Each relay terminal 30 has in the outer periphery thereof an annular groove 66 and an annular groove 67 that extend in the circumferential of the relay terminal 30. The aforementioned snap ring 32 is fitted in the annular groove 66 and an O-ring 33 is fitted in the annular groove 67. The annular groove 66 is provided at a position of the outer periphery of the relay terminal 30 adjacent to the end surface 65. The annular groove 67 is provided at a position that is closer to the end surface 64 than the annular groove 66 to the end surface 64.

Each relay terminal 30 is inserted through the insertion hole 54 from the inner side of the top wall 51 of the cover 28 and, with the annular groove 66 positioned out of or above the outer wall surface of the top wall 51, that is, out of the cover 28, the snap ring 32 is fitted in the annular groove 66. Then the snap ring 32 abuts the top surface 56 of the cylindrical wall portion 55 of the insertion hole 54, which prevents the relay terminal 30 from being slipped off from the insertion hole 54 and the relay terminal 30 is retained by the cover 28. It is to be noted that the snap ring 32 of the first embodiment is a known C-shaped snap ring.

The O-ring 33 is a known seal member that is made of rubber and prevents the ingress of water into the space A from the insertion hole 54. The O-ring 33 has a cross section with a diameter that is greater than the depth of the annular groove 67. In installing the relay terminal 30 in the insertion hole 54, the O-ring 33 is fitted in the annular groove 67, and then the relay terminal 30 with the O-ring 33 is inserted through the insertion hole 54. Then, the O-ring 33 that is in contact with the inner peripheral surface of the cylindrical wall portion 55 of the insertion hole 54 of the cover 28 is elastically deformed, thereby sealing the insertion hole 54 and preventing ingress of water into the space A through the insertion hole 54.

The following will describe a procedure for connecting the plurality of wires 23 and 25 to the terminal block device 12 of the first embodiment. The O-rings 33 are fitted to the relay terminals 30 before connecting the wires 23 and 25 to the relay terminals 30. Firstly, the procedure for connecting the U-phase wire 23U, the V-phase wire 23V, and the W-phase wire 23W to the terminal block device 12 will be described. The crimp terminals 24U, 24V, and 24W are attached or engaged onto the shaft portion 59 of the respective bolts 29, and the head portions 60 of the bolts 29 are inserted into the bottomed holes 41 of the terminal block body 27 that has previously been fixed to the electric motor 10 (see FIGS. 2, 3, and 6). The bottomed holes 41 are formed conforming to the contour of the hexagonal head portions 60 and, therefore, the bolts 29 inserted and retained in the bottomed holes 41 are prevented from being turned relative to the terminal block body 27.

Subsequently, the relay terminals 30 with the O-ring 33 fitted thereto are screwed onto the bolts 29 until the end surfaces 64 of the relay terminals 30 are brought into contact with the crimp terminals 24U, 24V, and 24W, respectively. As shown in FIG. 6, when the end surfaces 64 of the relay terminals 30 are in contact with the crimp terminals 24U, 24V, and 24W, respectively, the tip ends of the shaft portions 59 of the bolts 29 extend from the end surfaces 65 of the relay terminals 30.

Next, the cover 28 is fixed to the terminal block body 27 by the bolts 42. In fixing the cover 28, the cover 28 is placed onto the terminal block body 27 by inserting the relay terminals 30 into their corresponding insertion holes 54 so that the upper parts of the relay terminals 30 extend out of the insertion holes 54. Then, the snap rings 32 are fitted into the annular grooves 66 of the relay terminals 30 that are located outside the insertion holes 54. The relay terminals 30 having the snap ring 32 thus fitted thereto are retained by the cover 28 and the O-ring seals between the inner peripheral wall of the insertion hole 54 and the relay terminal 30. With the cover 28 thus fixed to the terminal block body 27, the space A (FIG. 5B) is formed between the terminal block body 27 and the cover 28 which is isolated from the outside. The U-phase wire 23U, the V-phase wire 23V, and the W-phase wire 23W are fixed to the terminal block device 12 in the space A. The insulating partition 57 provides insulation between any two adjacent wires in the space A (i.e. between the U-phase wire 23U and the V-phase wire 23V and between the V-phase wire 23V and the W-phase wire 23W).

Subsequently, the external U-phase wire 25U, V-phase wire 25V, and W-phase wire 25W are connected to the terminal block device 12, as shown in FIG. 6. The crimp terminals 26U, 26V, and 26W are engaged onto the shaft portion 59 of their corresponding bolts 29 that extend out of the relay terminals 30 and the nuts 31 are screwed onto the bolts 29 to secure the crimp terminals 26U, 26V, and 26W to the relay terminal 30. The nuts 31 are tightened until the crimp terminals 26U, 26V, and 26W are brought into pressing contact with the end surfaces 65 of the relay terminal 30 outside the cover 28. The crimp terminals 24U, 24V, and 24W and 26U, 26V, and 26W receiving an axial force produced by tightening the nuts 31 are pressed against the relay terminals 30 to be connected indirectly to the terminal block device 12. In the first embodiment, no axial force due to tightening of the nuts 31 is applied to the terminal block body 27 and the cover 28 and therefore, no creep occurs in the terminal block body 27 and the cover 28. It is to be noted that, with the nut 31 tightened, the head portion 60 of each bolt 29 may be spaced away from the bottom surface of the bottomed hole 41 as long as a part of the head portion 60 is in the bottomed hole 41. If the head portion 60 of the bolt 29 is spaced from the bottom surface of the bottomed hole 41, the bolt 29 having a part of the head portion 60 thereof positioned in the bottomed hole 41 is prevented from being turned relative to the terminal block body 27, and the bolt 29 is retained by the terminal block body 27.

Figure 7A:
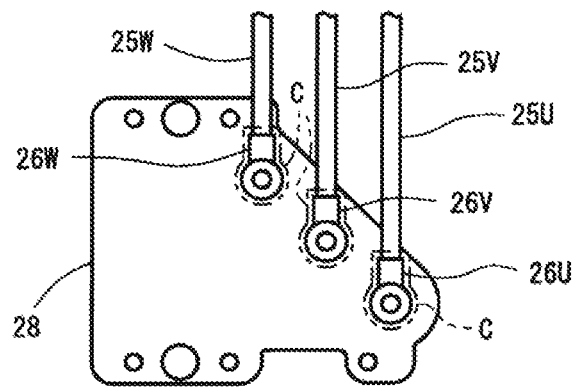
FIG. 7A is a plan view showing an example of connection of external wires to the terminal block device.
Figure 7B:
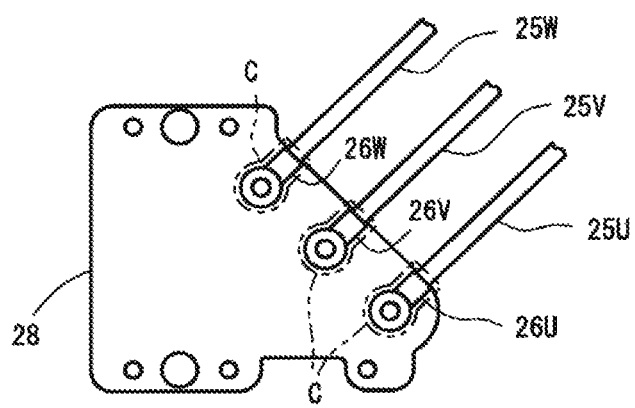
FIG. 7B is a plan view showing another example of connection of external wires to the terminal block device.
Figure 7C:
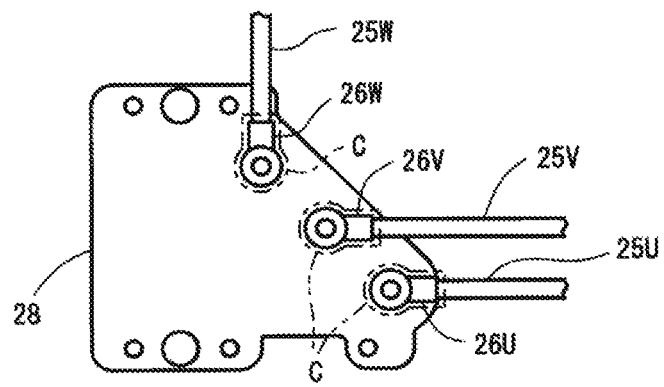
FIG. 7C is a plan view showing still another example of connecting the external wires to the terminal block device.

Referring to FIGS. 1 and 2, the U-phase wire 25U, the V-phase wire 25V, and the W-phase wire 25W are connected to the terminal block device 12 with the end portions thereof that are connected to the terminal block device 12 oriented in the same direction as the end portions of the respective U-phase wire 23U, V-phase wire 23V, and W-phase wire 23W. The directions in which the end portions of the respective U-phase wire 25U, the V-phase wire 25V, and the W-phase wire 25W that are connected to the terminal block device 12 are oriented may be changed, as shown in FIGS. 7A to 7C. The orienting direction of the U-phase wire 25U, the V-phase wire 25V, and the W-phase wire 25W in the connection thereof to the terminal block device 12 is free from restriction by the structure of the terminal block device 12, so that the freedom in the direction of wire connection is satisfactorily ensured. FIG. 7A shows an example of wire connection in which the end portions of the U-phase wire 25U, the V-phase wire 25V, and the W-phase wire 25W that are connected to the terminal block device 12 extend in the direction that is perpendicular to the direction in which the end portions of the U-phase wire 23U, the V-phase wire 23V, and the W-phase wire 23W extend for connection to the terminal block device 12. FIG. 7B shows an example of wire connection in which the end portions of the U-phase wire 25U, the V-phase wire 25V, and the W-phase wire 25W that are connected to the terminal block device 12 extend at an angle of 45 degrees with respect to the direction in which the end portions of the U-phase wire 23U, the V-phase wire 23V, and the W-phase wire 23W extend for connection to the terminal block device 12. FIG. 7C shows an example of wire connection in which the end portions of the U-phase wire 25U and the V-phase wire 25V that are connected to the terminal block device 12 extend in the same direction as the end portions of the U-phase wire 23U and the V-phase wire 23V extending for connection to the terminal block device 12, while the end portion of the W-phase wire 25W that is connected to the terminal block device 12 extends in a direction that is perpendicular to the direction in which the end portion of the W-phase wire 23W extend for connection to the terminal block device 23.

The terminal block device 12 of the first embodiment offers the following effects.

(1) The crimp terminals 24 of the wires 23 that are engaged onto the bolts 29 are in contact with the end surfaces 64 of the relay terminals 30 between the terminal block body 27 and the cover 28. The crimp terminals 26 of the wires 25 that are also engaged onto the bolts 29 are in contact with the end surfaces 65 of the relay terminals 30 outside the cover 28. The wires 23 and the wires 25 are thus connected to each other indirectly through the relay terminals 30 with the result that any axial force applied to the bolts 29 will not be transmitted to the terminal block body 27 and the cover 28 and, therefore, no creep occurs in the terminal block body 27 and the cover 28.

(2) The crimp terminals 26 of the wires 25 are connected to the relay terminals 30 outside the cover 28. Therefore, the orienting direction of the wires 25 for connection to the terminal block device 12 is free from restriction by the structure of the terminal block device 12 and the freedom in the orienting direction of the wire connection is substantially enhanced. According to the terminal block device 12 of the first embodiment, the U-phase wire 25U, the V-phase wire 25V, and the W-phase wires 25W may all be connected in different orienting directions.

(3) The insulating partitions 57 insulate the U-phase wire 23U, the V-phase wire 23V, and the W-phase wire 23W from one another in the space A between the terminal block body 27 and the cover 28. The insulating partitions 57 do not hinder the freedom in the extending direction of the U-phase wire 25U, the V-phase wire 25V, and the W-phase wire 25W. Furthermore, the presence of the insulating partitions 57 enhances the rigidity of the cover 28.

(4) The snap ring 32 retains the relay terminal 30 securely in the cover 28 without allowing the relay terminal 30 to be slipped off from the insertion hole 54. The snap ring 32 permits easy removal of the terminal relay 30 from the cover 28, as well as easy insertion of the relay terminal 30 in the cover 28.

(5) The O-ring 33 fitted to the relay terminal 30 provides sealing between the inner wall surface of the insertion hole 54 and the relay terminal 30 to prevent intrusion of water into the space A through the insertion hole 54 of the cover 28. Furthermore, each of the external U-phase wire 25U, V-phase wire 25V, and W-phase wire 25W is covered with the cap C, which prevents the ingress of water into the crimp terminals 26U, 26V, and 26W and the end surfaces 65 of the relay terminals 30.

(6) Each bolt 29 is held by the relay terminal 30 with the head portion 60 of the bolt 29 inserted in the bottomed hole 41 in the terminal block body 27, so that insertion and removal of the bolts 29 into and out from the bottomed holes 41 may be easily. Furthermore, there is no need to make resin molding for supporting a bolt such as 29, which helps to reduce the time required for manufacturing a terminal block device as compared with the case in which the resin member needs to be made to support a shaft member.

Second Embodiment

The following will describe a terminal block device according to a second embodiment of the present invention that is suitable for use in a three-phase induction motor. The terminal block device according to the second embodiment is different from the terminal block device according to the first embodiment in the configuration of the terminal block body and the cover. The configurations and elements of the electric motor and its related devices other than the terminal block device are common between the first and second embodiments. Therefore, the second embodiment uses the same reference numerals for such common configurations and elements and the description thereof will be omitted.

Figure 8:
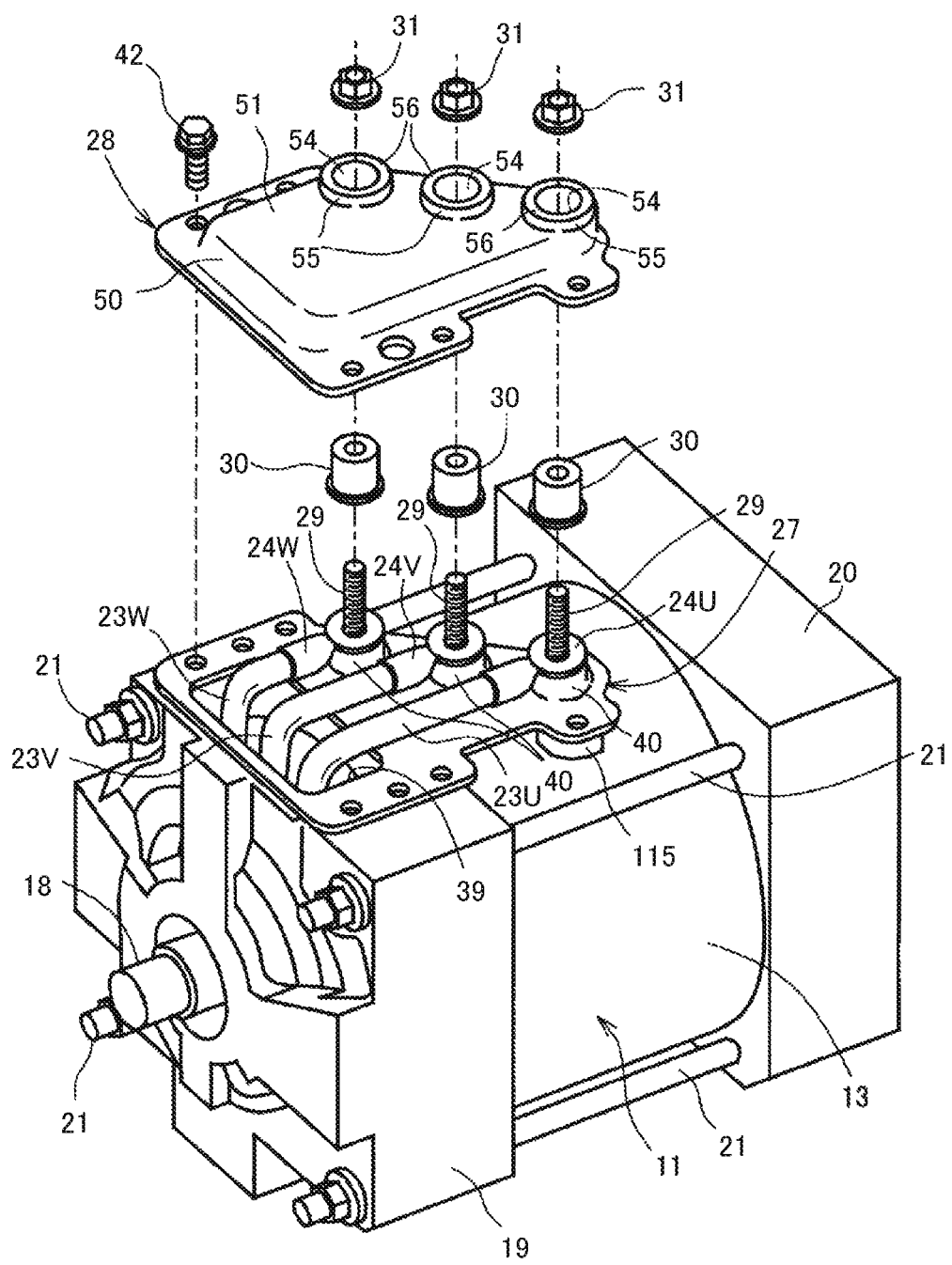
FIG. 8 is a perspective view of the electric motor of FIG. 1, showing the terminal block device in an exploded view.
Figure 9A:
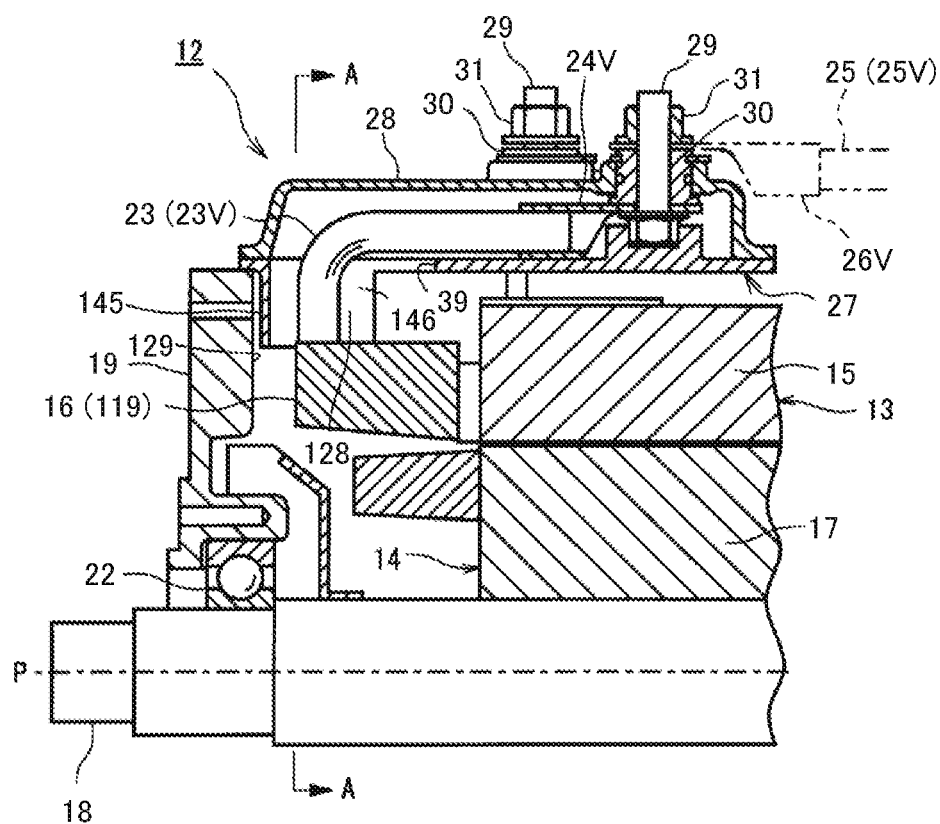
FIG. 9A is a longitudinal fragmentary sectional view of the electric motor of FIG. 1.
Figure 10:
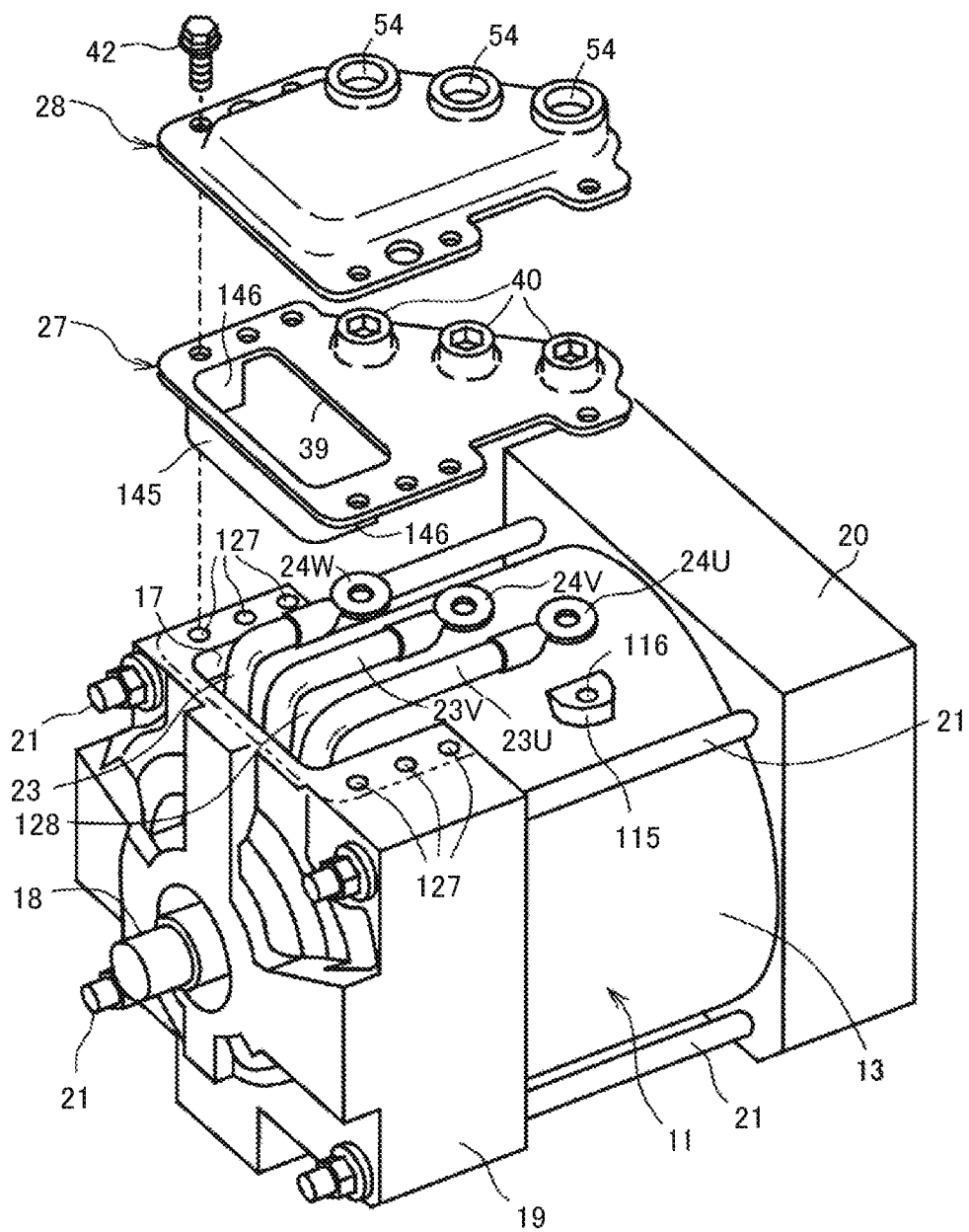
FIG. 10 is a perspective view of the electric motor of FIG. 1, showing a terminal block body and a cover of the terminal block device in an exploded view.

Referring to FIGS. 1 and 8, there is shown the electric motor 10 having the terminal block device 12 of the second embodiment. The electric motor 10 includes the motor body 11 and the terminal block device 12 is installed on the motor body 11. A three-phase induction motor is used as the electric motor. Referring to FIG. 9A, the motor body 11 includes the stator 13 and the rotor 14 that rotates within the stator 13. As shown in FIG. 10, the stator 13 has on the outer periphery thereof a mounting 115 to which a part of the terminal block device 12 is fixed. The mounting 115 has therein a threaded hole 116. The stator 13 includes the stator core 15 and the coil 16 having at opposite ends thereof coil ends. It is to be noted that FIG. 9A shows only one coil end of the coil 16 of the stator core. The electric motor 10 includes the rotary shaft 18 and the rotor 14 includes the rotor core 17 that is fixed on the rotary shaft 18.

As shown in FIGS. 1 and 8, the electric motor 10 further includes the front cover 19 and the rear cover 20 for covering the opposite coil ends of the coil 16 of the stator core 15, respectively. The front cover 19 and the rear cover 20 are fixed to the stator 13 by the bolts 21. As shown in FIG. 9A, one end of the rotary shaft 18 of the rotor 14 is supported by the front cover 19 through the bearing 22 and extends from the front cover 19. The one end of the rotary shaft 18 extending out from the front cover 19 serves as the output shaft. The other end of the rotary shaft 18 is supported through another bearing (not shown in the drawing). P in FIG. 9A indicates the axis of the rotary shaft 18 extending horizontally.

Figure 9B:
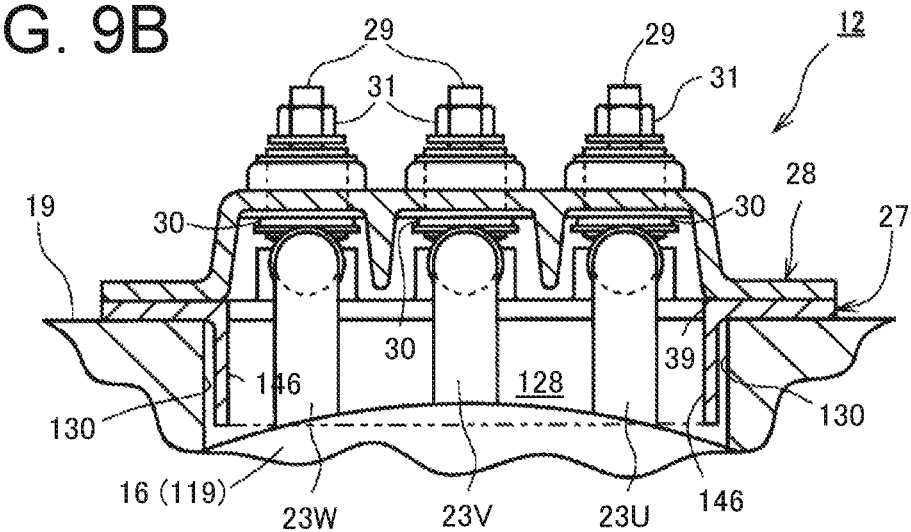
FIG. 9B is a cross-sectional view taken along line A-A of FIG. 9A.

The front cover 19 corresponds to the base of the present invention to which the terminal block device 12 is fixed. The upper surface of the front cover 19 serves as a support surface on which the terminal block device 12 is supported. As shown in FIG. 10, the front cover 19 has in the upper surface thereof a plurality of threaded holes 127 into which bolts 42 for fixing the terminal block device 12 are screwed. As shown in FIGS. 9A and 9B, a space 128 is formed between the upper part of the front cover 19 and the coil end 119. The wires 23 on the electric motor 10 side are housed in the front cover 19 and extend in the space 128. The space 128 is formed by cutting the upper surface of the front cover 19 from the rear cover 20 side. As shown in FIGS. 9A and 9B, the front cover 19 has a front wall 129 that faces the space 128 in the axial direction of the rotary shaft 18 and two side walls 130 that are disposed at opposite sides of the space 128 across the rotary shaft 18.

According to the second embodiment, the plurality of wires 23 extends from the coil end 119 of the coil 16 on the front cover 19 side of the electric motor 10. As shown in FIGS. 8 and 10, the wires 23 are three-phase wires including the U-phase wire 23U, the V-phase wire 23V, and the W-phase wire 23W and correspond to the first wires of the present invention. The U-phase wire 23U, the V-phase wire 23V, and the W-phase wire 23W are connected to the terminal block device 12. Each wire 23 has at one end thereof the round crimp terminal 24. Specifically, the U-phase wire 23U has the round crimp terminal 24U, the V-phase wire 23V has the round crimp terminal 24V, and the W-phase wire 23W has the round crimp terminal 24W, respectively. The external wires 25 are at one end thereof connected to the terminal block device 12, as indicated by phantom lines in FIGS. 1 and 9, and at the other end thereof to an external device, such as an inverter. As sown in FIG. 1, the wires 25 are three-phase wires including the U-phase wire 25U, the V-phase wire 25V, and the W-phase wire 25W and correspond to the second wires of the present invention. As many wires 25 as the wires 23 are provided. Each wire 25 has at one end thereof the round crimp terminal 26. Specifically, the U-phase wire 25U has the crimp terminal 26U, the V-phase wire 25V has the round crimp terminal 26V, and the W-phase wire 25W has the round crimp terminal 26W, respectively.

The following will describe the terminal block device 12 to which the wires 23 and the wires 25 are connected. As shown in FIG. 1, the terminal block device 12 according to the second embodiment is mounted across the front cover 19 and the mounting 115 of the stator 13 with the bolts 42 so that the terminal block device 12 is disposed on top of the electric motor 10. Referring to FIG. 8, the terminal block device 12 includes the terminal block body 27, the cover 28, the bolts 29, the cylindrical relay terminals 30, and the nuts 31. The terminal block body 27 and the cover 28 cooperate to form the terminal block device of the present invention. As many relay terminals 30, the bolts 29, and the nuts 31 as the respective wires 23 and 25 are provided. The bolts 29, the relay terminals 30, and the nuts 31 are made of a conductive material and correspond to the terminal portion of the terminal block device 12 that electrically connects the wires 23 and 25 to each other.

Figure 11A:
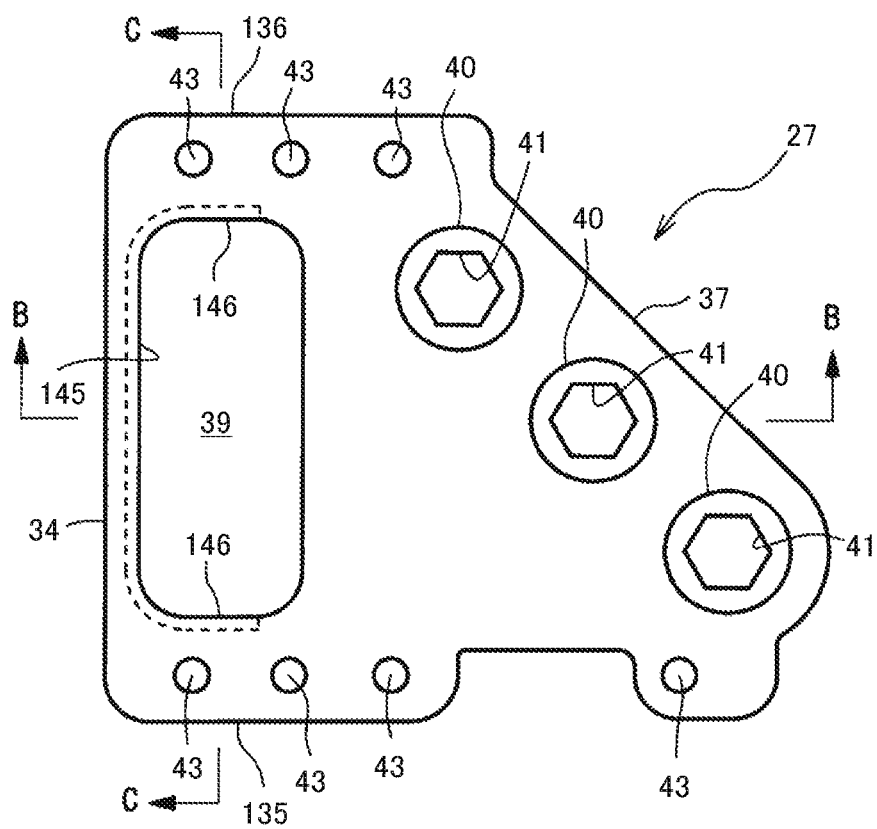
FIG. 11A is a plan view of the terminal block body of FIG. 10.

The terminal block body 27 is made of an insulation material such as polyamide resin, formed in a flat plate shape. As shown in FIG. 11A, the terminal block body 27 as mounted on the electric motor 10 has the front edge 34 that is located on the front cover 19 side. The terminal block body 27 also has the side edges 35 and 36 that extend from the opposite ends of the front edge 34, respectively, substantially at a right angle. The side edge 35 extending from one end of the front edge 34 is longer than the side edge 36 extending from the other end of the front edge 34 as measured in the direction perpendicular to the extending direction of the front edge 34. The terminal block body 27 also has the rear edge 37 that extends between the side edges 35 and 36 on the side of the terminal block body 27 opposite to the front edge 34. The rear edge 37 extends at an angle of about 45 degrees with respect to the front edge 34. The front edge 34, the side edge 35, the side edge 36, and the rear edge 37 cooperate to form the outer periphery of the terminal block body 27. As indicated by hatching in FIG. 11, the terminal block body 27 has in the outer peripheral region thereof a joint portion that is joined with the cover.

Figure 11B:
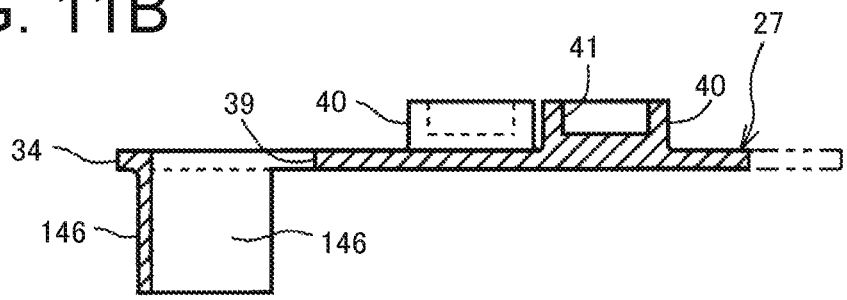
FIG. 11B is a cross-sectional view taken along line B-B in FIG. 11A.
Figure 11C:
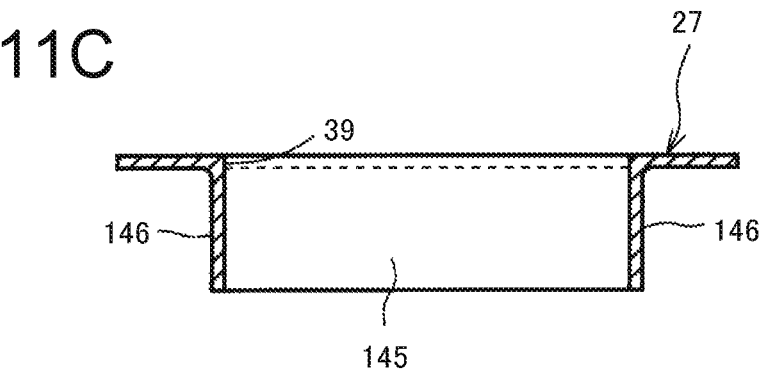
FIG. 11C is a cross-sectional view taken along line C-C in FIG. 11B.

The terminal block body 27 has a rectangular opening 39 at a position closer to the front edge 34 than to the rear edge 37. The U-phase wire 23U, the V-phase wire 23V, and the W-phase wire 23W are passed through the opening 39. As shown in FIGS. 11B and 11C, the terminal block body 27 has on the underside thereof a first partition plate 145 and a pair of second partition plates 146 that are formed conforming to a part of the opening 39. The first partition is plate 145 and the second partition plates 146 are formed integrally with the terminal block body 27 and extend downward from the under-side surface of the terminal block body 27. The first partition plate 145 is formed along the front edge 34 of the four sides of the opening 39. The second partition plates 146 are formed along the side edges 35 and 36, respectively, of the four sides of the opening 39.

According to the second embodiment, the first partition plate 145 and the second partition plates 146 that are formed integrally are disposed in the space 128 with the terminal block body 27 fixed to the front cover 19 of the electric motor 10. As shown in FIG. 9A, the first partition plate 145 is interposed between the first wires 23 and the front wall 129 of the front cover 19 in the direction in which the first wires 23 extend from the space 128 toward the terminal portion and functions to prevent contact between the front wall 129 of the front cover 19 and the wires 23. As shown in FIG. 9A, each wire 23 has a coil-side portion extending radially outwardly from the coil end 119, an intermediate bent portion, and a terminal-side portion extending between the bent portion and the terminal portion or from the bent portion to the terminal portion. As shown in FIG. 9B, the second partition plates 146 are interposed between the first wires 23 and the side walls 130 of the front cover 19 in the direction perpendicular to the extending direction of the first wires 23 from the space 128 toward the terminal portion and function to prevent contact between the side walls 130 of the front cover 19 and the wires 23. The second partition plates 146 extend parallel to the extending direction of the terminal-side portions of the wires 23 from the bent portions to the terminal portions. According to the second embodiment, the first partition plate 145 and the second partition plates 146 are disposed so as to protect the U-phase, V-phase, and W-phase wires 23U, 23V, 23W from contacting with the front wall 129 of the front cover 19 and also protect the outer U-phase and W-phase wires 23U, 23W from contacting with the opposite side walls 130 of the front cover 19.

Three raised portions 40 are formed in the surface of the terminal block body 27 at positions closer to the rear edge 37 than to the front edge. Each raised portion 40 has the hexagonal bottomed hole 41 in which part of the bolt 29 is insertable. The bottomed holes 41 are arranged along the rear edge 37 that is inclined at an angle of about 45 degrees with respect to the front edge 34. The terminal block body 27 has the holes 43 through which the bolts 42 for fixing the terminal block body 27 to the electric motor 10 are inserted. The holes 43 are disposed along the opposite side edges 35 and 36.

Figure 12A:
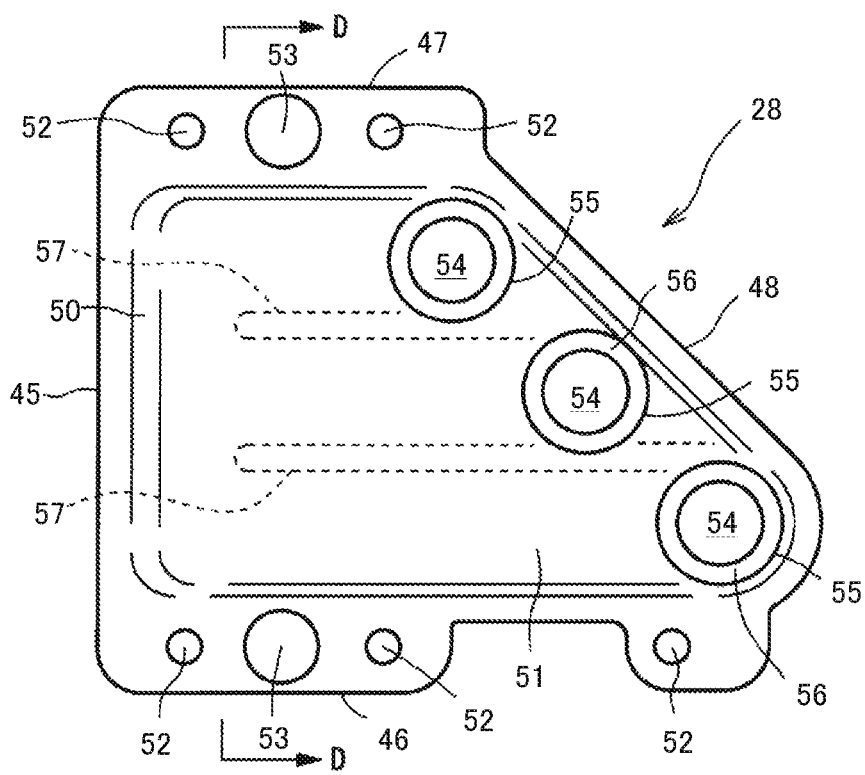
FIG. 12A is a plan view of the cover of FIG. 10.

The cover 28 is made of the same insulation material as the terminal block body 27. The outer periphery of the cover 28 conforms to the outer periphery of the terminal block body 27. Specifically, as shown in FIG. 12A, the cover 28 has a front edge 45 that corresponds to the front edge 34 of the terminal block body 27, side edges 46 and 47 that correspond to the side edges 35 and 36, respectively, and a rear edge 48 that corresponds to the rear edge 37. As indicated by hatching, the cover 28 has in the outer peripheral region thereof a joint portion that is joined with the joint portion of the terminal block body 27. The cover 28 includes a peripheral wall 50 that rises from the inner edge of the joint portion and a top wall 51 that is formed integrally with the peripheral wall 50 and spaced from the joint portion, so that a space is formed between the cover and the terminal block body 27. The joint portion has a plurality of holes 52 and 53 through which the bolts 42 are inserted.

Figure 12B:
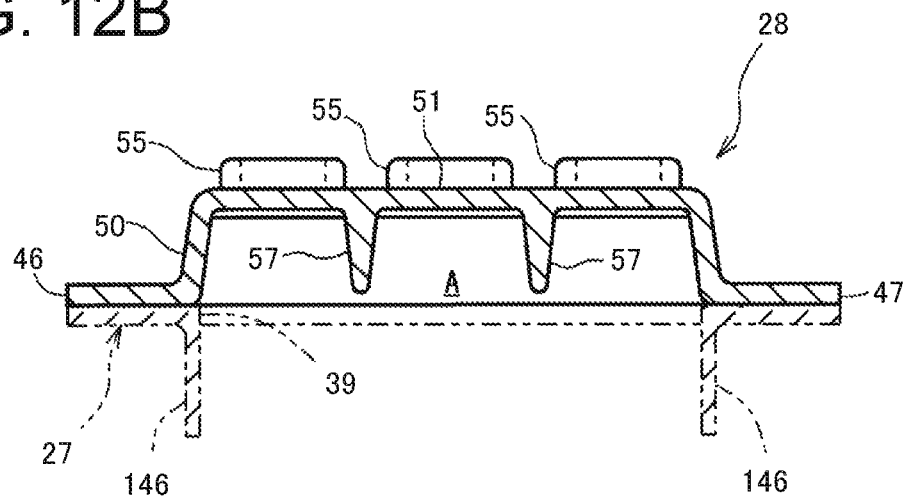
FIG. 12B is a cross-sectional view taken along line D-D in FIG. 12A.

As shown in FIG. 12B, with the cover 28 placed on the terminal block body 27 and joined together at the joint portions of the cover 28 and the terminal block body 27, the space A is formed between the terminal block body 27 and the cover 28 in which part of the U-phase wire 23U, the V-phase wire 23V, and the W-phase wire 23W are disposed. The inner wall surface of the top wall 51 of the cover 28 faces the terminal block body 27. The terminal block body 27 has a surface facing the cover 28 except for the joint portion and the opening 39. Such surface that faces the inner wall surface of the top wall 51 corresponds to the opposing surface of the present invention.

The cover 28 has the insertion holes 54 at positions closer to the rear edge 48 than to the front edge 45. The relay terminals 30 are inserted through the insertion holes 54. With the cover 28 disposed on and joined to the terminal block body 27, the centers of their insertion holes 54 coincide with the centers of their corresponding bottomed holes 41. Specifically, the insertion hole 54 and the bottomed hole 41 in pair are disposed concentric to each other in vertical direction. In the second embodiment, the insertion holes 54 are provided corresponding to the bottomed holes 41 of the three raised portions 40. Each insertion hole 54 has the cylindrical wall portion 55 that is formed integrally with and raised from the top wall 51 so as to surround the insertion hole 54. Each cylindrical wall portion 55 has the annular top surface 56 that is parallel to the top wall 51 of the cover 28.

The cover 28 has two insulating partitions 57 extending from the inner wall surface of the top wall 51 so as to divide the space A into three parts. Each insulating partition 57 has a length in the direction perpendicular to the front edge 45. Each insulating partition 57 extends such that one end thereof on the rear edge 48 side is disposed between two adjacent insertion holes 54 and reaches the joint portion while the other end thereof on the front edge 45 side does not reach the joint portion. The insulating partitions 57 provide insulation between any two adjacent wires (i.e. between the U-phase wire 25U and the V-phase wire 25V and between the V-phase wire 25V and the W-phase wire 25W) in the space A.

The bolt 29 is a hexagon head bolt including an externally threaded shaft portion and a head portion. The nut 31 as the fastening member of the present invention is a known nut which allows the shaft portion of the bolt 29 to be screwed thereinto. The relay terminals 30 are made of highly conductive copper and formed in a cylindrical shape. The relay terminals 30 connect the wires 23 on the electric motor 10 side and the external wires 25 to each other in an indirect manner.

In the second embodiment, one end surface of each relay terminal 30 corresponds to the seat surface of the present invention that is contactable with the crimp terminal 24 of the wire 23 on the electric motor 10 side. The other end surface of the relay terminal 30 corresponds to the seat surface of the present invention that is contactable with the crimp terminals 26 of the external connection wires 25.

The following will describe a procedure for mounting the terminal block device 12 of the second embodiment to the front cover 19 and for wiring of the wires 23 and 25. Firstly, with the partition plates 145 and 146 inserted in the space 128 of the front cover 19, the terminal block body 27 of the terminal block device 12 is fixed to the front cover 19 using two bolts 26 (see FIGS. 8 and 11). The partition plate 145 faces the front wall 129 of the front cover 19, and the partition plate 146 faces the side walls 130 (see FIGS. 9A and 9B).

The U-phase wire 23U, the V-phase wire 23V, and the W-phase wire 23W on the electric motor 10 side are disposed so as to extend through the space 128 and the opening 39 of the terminal block body 27. The U-phase wire 23U, the V-phase wire 23V, and the W-phase wire 23W are then bent such that the crimp terminals 24U, 24V, and 24W are mounted on the raised portions 40 of the terminal block body 27. Parts of the U-phase wire 23U, the V-phase wire 23V, and the W-phase wire 23W that are in the space 128 are arranged so as to extend upward from the coil end 119. The first partition plate 145 is interposed between the parts of the U-phase wire 23U, the V-phase wire 23V, and the W-phase wire 23W that are in the space 128 and the front wall 129 to thereby provide insulation between the U-phase wire 23U, the V-phase wire 23V, and the W-phase wire 23W and the front cover 19. One second partition plate 146 is interposed between the wire 23U and one side wall 130 adjacent to the wire 23U so as to provide insulation between the wire 23U and the front cover 19. The other second partition plate 146 is interposed between the wire 23W and the other side walls 130 adjacent to the wire 23W to provide insulation between the wire 23W and the front cover 19.

The following will describe a procedure for connecting the U-phase wire 23U, the V-phase wire 23V, and the W-phase wire 23W to the terminal block device 12. The crimp terminals 24U, 24V, and 24W are engaged onto the shaft portion of the respective bolts 29, and the head portions of the bolts 29 are inserted into the bottomed holes 41 of the terminal block body 27 that has previously been fixed to the electric motor 10 (see FIG. 8).

Subsequently, the relay terminals 30 are screwed onto the bolts 29 until the relay terminals 30 contact with the crimp terminals 24U, 24V, and 24W, respectively. As shown in FIG. 9A, when the relay terminal 30 are in contact with the crimp terminals 24U, 24V, and 24W, respectively, the tip ends of the shaft portions of the bolts 29 are extended from the end surfaces of the relay terminals 30.

Next, the cover 28 is fixed to the terminal block body 27 by the bolts 42. In fixing the cover 28, the cover 28 is placed onto the terminal block body 27 by inserting the relay terminals 30 into their corresponding insertion holes 54 so that the upper parts of the relay terminals 30 extend out of the insertion holes 54. When the cover 28 is fixed to the terminal block body 27 from above, the space A is formed between the terminal block body 27 and the cover 28 in such a manner that the space A is isolated from the outside. The U-phase wire 23U, the V-phase wire 23V, and the W-phase wire 23W are fixed to the terminal block device 12 in the space A. The insulating partitions 57 provide insulation between any two adjacent wires in the space A (i.e. between the U-phase wires 23U and the V-phase wire 23V and between the V-phase wire 23V and the W-phase wire 23W).

Subsequently, the external U-phase wire 25U, V-phase wire 25V, and W-phase wire 25W are connected to the terminal block device 12. The crimp terminals 26U, 26V, and 26W are engaged onto the shaft portion of the corresponding bolts 29 that extend out of the relay terminals 30 and the nuts 31 are screwed onto the bolts 29 to secure the crimp terminals 26U, 26V, and 26W to the relay terminal 30. The nuts 31 are tightened until the crimp terminals 26U, 26V, and 26W are brought into pressing contact with the end surfaces of the relay terminals 30 outside the cover 28. The crimp terminals 24U, 24V, and 24W and 26U, 26V, and 26W receiving an axial force produced by tightening the tightened nuts 31 are pressed against the relay terminals 30 to be connected indirectly to the terminal block device 12.

The terminal block device 12 of the second embodiment offers the following effects.

(1) In the terminal block device 12 in which the first partition plate 145 is interposed between the wires 23 and the front wall 129 of the front cover 19 so as to physically isolate the wires 23 and the front wall 129 of the front cover 19. Therefore, insulation is ensured between the wires 23 and the front wall 129 irrespective of the degree of bending of the wires 23. As a result, the wires 23 may be connected to the terminal block body 27 easily irrespective of the degree of bending of the wires 23, so that the time for connecting the wires 23 to the terminal block device 12 may be shortened.

(2) In the structure in which the first partition plate 145 is formed extending from the terminal block body 27, the terminal block body 27 may be positioned easily and properly relative to a fixed position by inserting the first partition plate 145 into the space 128 along the front wall 129 of the front cover 19 of the terminal body 27.

(3) The second partition plates 146 are interposed between the U-phase wire 23U and one of the side walls 130 of the front cover 19 and between the W-phase wire 23W and the other of side walls 130 of the front cover 19 in the direction that is perpendicular to the direction in which the wires 23 extend from the space 128 toward the terminal portion so as to physically isolate the wires 23 and the base from each other. The first wires 23 (23U, 23W) and the side walls 130 are physically isolated from each other by the second partition plates 146 in the direction that is perpendicular to the extending direction of the wires 23 extending from the space 128 to the terminal portion.

Third Embodiment

A terminal block device according to a third embodiment of the present invention will now be described. The terminal block device according to the third embodiment is different from the terminal block device according to the second embodiment in the configuration of the terminal block body and the cover. The configurations and elements of the electric motor and its related devices other than the terminal block device are common between the second and the third embodiments. Therefore, the third embodiment uses the same reference numerals for such common configurations and elements and the description thereof will be omitted.

Figure 13:
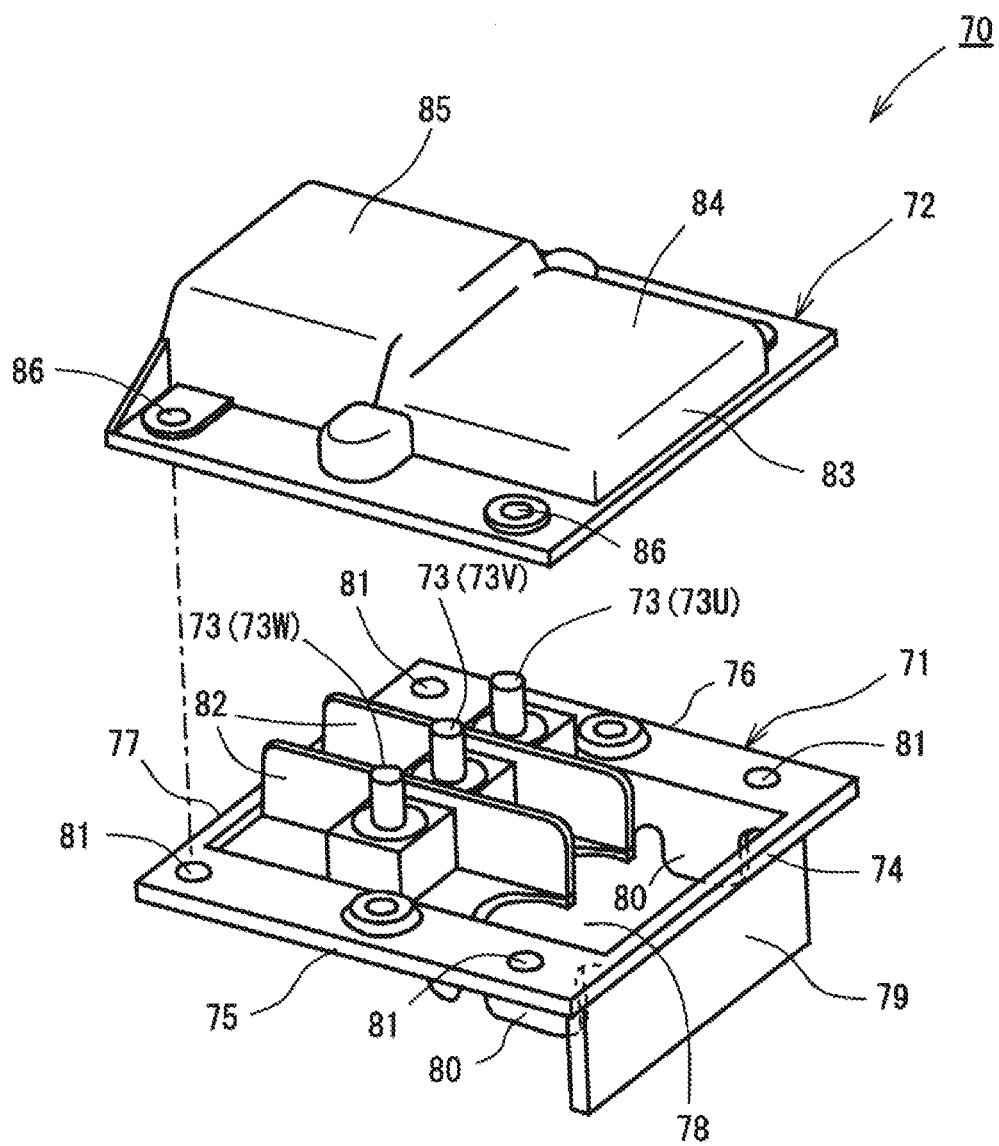
FIG. 13 is an exploded perspective view of the terminal block device according to a third embodiment of the present invention.

Referring to FIG. 13, a terminal block device 70 according to the third embodiment includes a terminal body 71, a cover 72, and a plurality of terminal portions 73. The terminal block body 71 and the cover 72 of the third embodiment correspond to the terminal block of the present invention. As many terminal portions 73 as the wires of the respective three-phase wires 23, 25 are provided. The terminal block 71 is made of an insulation material, such as polyamide resin, formed in a flat plate shape. The terminal block body 71 as mounted on the electric motor 10 has a front edge 74 that is located on the front cover 19 side and a pair of side edges 75 and 76 that extend from opposite ends of the front edge 74, respectively, substantially at a right angle. The side edges 75 and 76 have the same length. The terminal block body 71 also has a rear edge 77 that extends between the ends of the side edges 75 and 76 that are opposite to the ends connected to the front edge 47. The rear edge 77 and the front edge 74 are parallel to each other. The front edge 74, the side edges 75 and 76, and the rear edge 77 cooperate to form the outer periphery of the terminal block body 71. The terminal block body 71 has in the outer peripheral region thereof a joint portion that is joined with the cover 72.

The terminal block body 71 has a rectangular opening 78 at a position closer to the front edge 70 than to the rear edge 77. The opening 78 is formed for allowing the U-phase wire 23U, the V-phase wire 23V, and the W-phase wire 23W (not shown) are to be passed therethrough. A first partition plate 79 and a pair of second partition plates 80 are formed on the bottom surface of the terminal block body 71 along a part of the opening 78. The first partition plate 79 and the second partition plates 80 are fixed to the terminal block body 71 so as to extend downward from the under-side surface of the terminal block body 71. The first partition plate 79 is formed along the front edge 74 and the second partition plates 80 are formed along the edges 75 and 87, respectively, of the four sides of the opening 78.

In the third embodiment, the first partition plate 79 and the second partition plates 80 are provided separately from each other and disposed within the space 128 with the terminal block body 71 fixed in place to the front cover 19. The first partition plate 79 is interposed between the vertical portions of the respective first wires 23 and the front wall 129 of the front cover 19 to prevent contact between the front wall 129 of the front cover 19 and the wires 23. As shown FIG. 14, each wire 23 has a coil-side portion extending radially outwardly from the coil end 119, the bent portion, and the terminal-side portion extending between the bent portion and the terminal portions 73, or from the bent portion to the terminal portions 73. The second partition plates 80 are interposed between the U-phase wire 23U and the W-phase wire 23W and the side walls 130 of the first cover wires 23, respectively in the extending direction of the wires 23 from the space 128 toward the terminal portions 73 to prevent contact between the side wall 130 of the front cover 19 and the U-phase wire 23U and the W-phase wire 23W. The second partition plates 80 extend parallel to the extending direction of the terminal-side portions of the wires 23 from the bent portions to the terminal portions 73. According to the third embodiment, the first partition plate 79 and the second partition plates 80 are disposed so as to protect the U-phase, V-phase, and W-phase wires 23U, 23V, 23W from contacting with the front wall 129 of the front cover 19 and also protect the outer U-pase and W-phase wires 23U, 23W from contact with the opposite side walls 130 of the front cover 19.

Three terminal portions 73 (73U, 73V, and 73W) are disposed between the opening 78 and the rear edge 77. Each terminal portion 73 has a shaft portion which is inserted into the crimp terminal of the wire 23. The terminal block body 71 has therethrough a plurality of insertion holes 81 through which the bolts 42 are inserted for fastening the terminal block 71 to the electric motor 10. The insertion holes 81 are formed through the joint potions of the terminal block body 71 along the side edges 75 and 76. The terminal block body 71 has a pair of insulation partitions 82 provided between any two adjacent terminal portions 73.

The cover 72 is made of the same insulation material as the terminal block body 71. The outer periphery of the cover 72 substantially conforms to the outer periphery of the terminal block body 71. The cover 72 has along the outer periphery thereof a joint portion at which the cover 72 is joined to the terminal block body 71. The cover 72 has peripheral side walls 83 that rises from the inner edge of the joint portion of the cover 72 and a first top wall 84 and a second top wall 85 that are formed continuously with the peripheral side walls 83 so that a space is formed between the terminal block body 71 and the cover 72 as mounted to the terminal block body 71. The first top wall 84 is disposed above the opening 78, and the second top wall 85 is formed at a level higher than the first top wall 84. The second top wall 85 of the cover 72 is raised to such an extent that allows the second wires 25 to be passed in the space below the second top wall 85. The joint portion of the cover 72 has therethrough a plurality of insertion holes 86 through which the bolts 26 are passed for fastening the cover 72 to the terminal block body 72.

Figure 14:
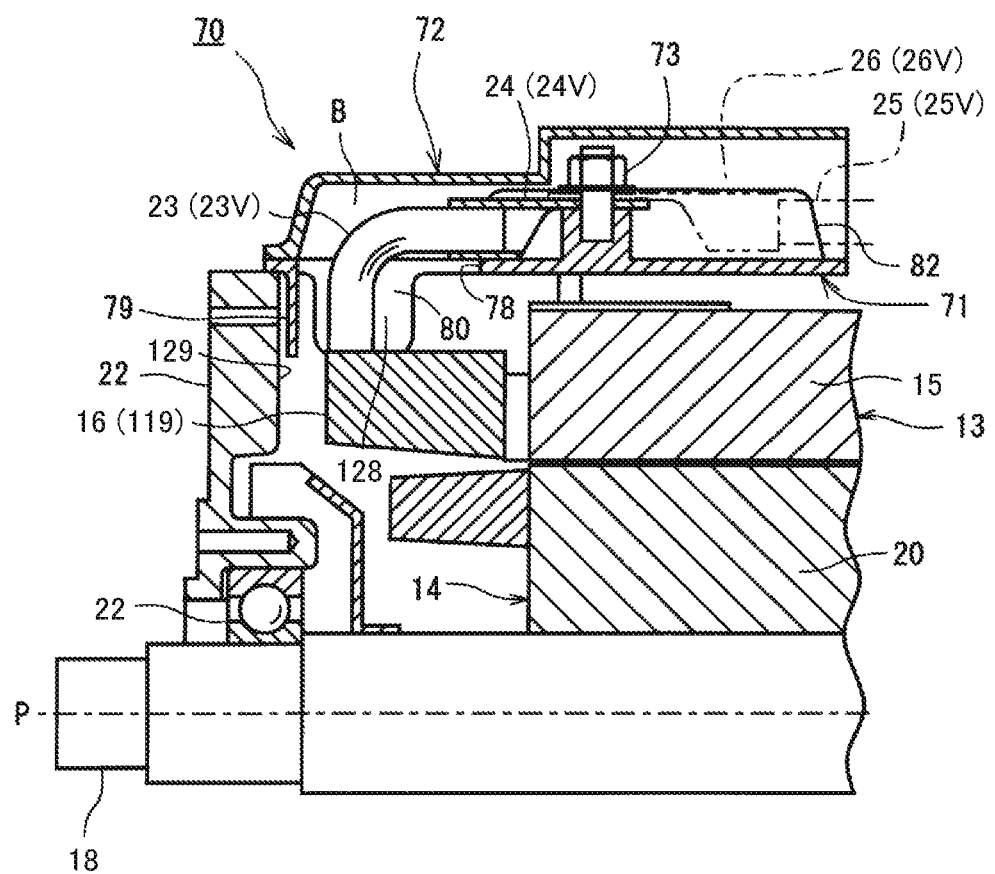
FIG. 14 is a longitudinal sectional view of the terminal block device of FIG. 13.

With the cover 72 joined to the terminal block body 71 at the joint portions thereof, as shown in FIG. 14, a space B is formed between the terminal block body 71 and the cover 72 which is large enough to receive therein the U-phase wire 25U, the V-phase wire 25V, and the W-phase wire 25W. The inner surface of the first top wall 84 of the cover 71 as joined to the terminal block body 71 faces the terminal block body 71. The terminal block device 70 according to the third embodiment offers the same effects as the second embodiment.

The present invention is not limited to the above embodiments, but it may variously be embodied without departing from the gist of the present invention, for example, as follows.

In the first embodiment, the insulating partitions are provided in the cover to insulate the wires on the electric motor side from one another. However, the insulating partitions may be provided, for example, in the terminal block body. The insulating partitions provided in the terminal block body also insulate the U-phase wire, the V-phase wire, and the W-phase wire on the electric motor side from one another. Additionally, the presence of the insulation partitions enhances the rigidity of the terminal block body. The insulating partitions may be provided in both the terminal block body and the cover.

Three different arrangements of the second wires, or the U-phase wire 25U, the V-phase wire 25V, and the W-phase wire 25W, have been shown with reference to FIGS. 7A to 7C. According to the present invention, however, the second wires may be arranged freely for connection to the terminal block device as long as the U-phase wire, the V-phase wire, and the W-phase wire do not cross one another. In other words, the second wires may be connected to the terminal block device in all directions around the shaft member.

The insertion hole of the relay terminal according to the first embodiment is internally threaded to receive the externally threaded bolt as the shaft member of the present invention. According to the present invention, however, the insertion hole may be formed as a plain hole having no thread. When the insertion hole is formed as a plain hole, the shaft portion of the bolt may be externally threaded at a part thereof to receive the nut.

Although the known hexagon head bolt is used as the shaft member in the first embodiment, the shaft member is not limited to such configuration as long as the shaft member allows attachment or engagement of wires thereon and fastening of the fastening member thereon and is prevented from turning about its own axis relative to the cover.

According to the above embodiments, the first wires and the second wires are connected to each other so as to make three pairs of such first and second wires for the three-phase motor. According to the present invention, however, the number of the respective first and the second wires for connection to the terminal block device is not limited to three, and any plural number, such as two or four, may be selected for each of the first and the second wires.

Although the relay terminal is retained in the cover by the retainer in the first embodiment, the retainer is not an essential part of the present invention. According to the present invention, the relay terminal may not be retained in the cover when the fastening member is fastened onto the shaft member to which the first wires and the second wires have been connected. In this case, the terminals of the second wires restrict the relay terminals being slipped off from off the cover.

Although the snap ring of the first embodiment is used as the retainer, the retainer is not limited to the snap ring. The configuration and the shape of the retainer may be changed as long as the retainer prevents the relay terminal from being slipped off from the insertion hole of the cover.

Although the O-ring is used as the seal member in the first embodiment, the seal member is not limited to the O-ring, but any type of retainer may be used as long as the retainer prevents the ingress of water into the space in the terminal block device.

Although the O-ring is fitted on the relay terminal in the first embodiment, the O-ring is not an essential part of the present invention. When there is no fear of ingress of water into the space of the terminal block device, the provision of the O-ring is not required. In such configuration of the terminal block device having no O-ring, the number of components of the terminal block device can be reduced.

Although the three-phase induction motor is used as the electric motor in the above embodiments, the type of the electric motor is not limited thereto. According to the present invention, a synchronous motor or a synchronous generator may also be used in place of the electric motor. The terminal block device is applicable to any other power devices than the electric motor.

Although the second partition plates 146, 80 are provided in the second and third embodiments, the second partition plates are not essential parts and, therefore, the terminal block device may dispense with such second partition plates.

What is claimed is:
1. A terminal block device comprising:
a terminal block body made of an insulating material;

a cover that is made of an insulating material and covers the terminal block body;

a shaft member that is held by the terminal block body to engage a terminal of a first wire and a terminal of a second wire;

a cylindrical relay terminal through which the shaft member is inserted and which is inserted through the cover; and a fastening member that is mounted on the shaft member to fasten the terminal of the first wire and the terminal of the second wire to the relay terminal, wherein the relay terminal includes a first seat surface that is contactable with the terminal of the first wire between the terminal block body and the cover and a second seat surface that is contactable with the terminal of the second wire outside the cover.

2. The terminal block device according to claim 1, wherein the number of the first wires is plural, the number of the second wires is plural, the cover includes an inner wall surface that faces the terminal block body, the terminal block body includes an opposing surface that faces the inner wall surface, and an insulating partition that extends from at least one of the inner wall surface and the opposing surface and provides insulation between two adjacent ones of the wires.

3. The terminal block device according to claim 1, wherein the cover has an insertion hole through which the relay terminal is inserted, and a retainer that is mounted to the relay terminal and prevents the relay terminal from being slipped off from the insertion hole of the cover.

4. The terminal block device according to claim 3, wherein an annular seal member is mounted to an outer periphery of the relay terminal, and the seal member provides sealing in the insertion hole between the relay terminal and the cover.

5. A terminal block device to be fixed to a base and electrically connected to one end of a first wire and one end of a second wire, wherein the base houses the other end of the first wire, and wherein the first wire includes a bent portion and a terminal-side portion that extends from the bent portion to the one end of the first wire, comprising:

a terminal block that is made of an insulating material;

a terminal portion that is mounted to the terminal block; and a partition plate that extends from the terminal block perpendicularly to a direction in which the terminal-side portion extends, wherein the partition plate is interposed between the other end of the first wire and the base after the terminal block is fixed to the base.

6. The terminal block device according to claim 5, wherein the terminal block includes a terminal block body to be fixed to the base and a cover that covers the terminal block body, the terminal block body has an opening through which the first wire is inserted, and the partition plate extends from the terminal block body.

7. The terminal block device according to claim 5, wherein the partition plate is a first partition plate, a second partition plate extends from the terminal block parallel to a plane in which the first wire extends, and the second partition plate is interposed between the other end of the first wire and the base after the terminal block is fixed to the base.

8. The terminal block device according to claim 5, wherein the first wire is connected from an electric motor to the terminal block, and the second wire is connected from the terminal block to an external device.

* * * * *